(12) United States Patent
Murakami

(10) Patent No.: US 8,363,334 B2
(45) Date of Patent: Jan. 29, 2013

(54) LENS BARREL

(75) Inventor: Taro Murakami, Tokyo (JP)

(73) Assignee: Canon Kabushiki Kaisha (JP)

( * ) Notice: Subject to any disclaimer, the term of this patent is extended or adjusted under 35 U.S.C. 154(b) by 1 day.

(21) Appl. No.: 13/207,577

(22) Filed: Aug. 11, 2011

(65) Prior Publication Data

US 2012/0044578 A1 Feb. 23, 2012

(30) Foreign Application Priority Data

Aug. 18, 2010 (JP) .................................. 2010-183298

(51) Int. Cl.
*G02B 15/14* (2006.01)
*G02B 7/02* (2006.01)

(52) U.S. Cl. .................... 359/694; 359/823; 359/819

(58) Field of Classification Search .......... 359/694–704, 359/811–830
See application file for complete search history.

(56) References Cited

U.S. PATENT DOCUMENTS

| 5,005,956 A | * | 4/1991 | Kaneda et al. | ................ | 359/698 |
| 7,911,721 B2 | * | 3/2011 | Iwasa | ............................. | 359/823 |
| 8,023,212 B2 | * | 9/2011 | Kudoh | ........................... | 359/823 |

FOREIGN PATENT DOCUMENTS

JP 2856557 B2 2/1999

* cited by examiner

*Primary Examiner* — Mohammed Hasan
(74) *Attorney, Agent, or Firm* — Rossi, Kimms & McDowell LLP

(57) ABSTRACT

A lens barrel capable of increasing the degree of freedom of installation of a detection unit and capable of making the lens barrel compact in size. The lens barrel includes third and fourth lens groups disposed adjacent to each other and movable in a common optical axis direction. In a first movement section, the third lens group moves in unison with the fourth lens group. In a second movement section adjacent to the first movement section, only the third lens group moves. When a photointerrupter fixed to a cover of the third lens group is light-shielded by a light shield plate formed on a lens holder of the fourth lens group, it is detected that a distance between the third and fourth lens groups becomes a predetermined distance.

4 Claims, 20 Drawing Sheets

LENS BARREL

BACKGROUND OF THE INVENTION

1. Field of the Invention

The present invention relates to a lens barrel having plural optical systems that are movable in a common optical axis direction.

2. Description of the Related Art

Conventionally, a lens barrel having plural optical systems movable in a common optical axis direction has been known. For example, there are image pickup apparatuses (such as a silver halide camera, digital camera, and digital video camera) having a zoom lens barrel that is movable between a storage position and a photographing position in an optical direction to change photographing magnification.

Such a conventional zoom lens barrel is generally provided with a photointerrupter (PI sensor) fixed to a stationary frame of the lens barrel and serving as a reset sensor for detecting whether a lens holding frame is moved up to a reset position. The lens holding frame is mounted with a light shield plate for intercepting light directed toward the PI sensor. Whether a light receiving device of the IP sensor is in a light-shielded state or in a non-light-shielded state is determined to thereby detect, as the reset position of the lens holding frame, a position of changeover between the light-shielded state and the non-light-shielded state.

Japanese Patent Publication No. 2856557 discloses an image pickup apparatus that detects relative positions of first and second group lens units of a lens barrel. In this image pickup apparatus, a photodetector (corresponding to the photointerrupter) is fixed to the second group lens unit and a slit plate (corresponding to the light shield plate) is mounted to a lens holding frame which is movable and holds the first group lens.

However, since the conventional image pickup apparatus requires that a place for installation of the photointerrupter be provided in the stationary frame, the degree of freedom of installation of the photointerrupter becomes low and the lens barrel becomes large in size. If an attempt is made to freely set the position of changeover between light-shielded state and non-light-shielded state, the light shield plate becomes long. This poses a problem that a detection mechanism including the photointerrupter becomes large. In particular, the image pickup apparatus disclosed in Japanese Patent Publication No. 2856557 requires a space for installation of a large slit plate, posing a problem that the lens barrel becomes large in size.

SUMMARY OF THE INVENTION

The present invention provides a lens barrel capable of increasing the degree of freedom of installation of a detection unit and capable of making the lens barrel compact in size.

According to the present invention, there is provided a lens barrel, which comprises first and second optical systems movable in a common optical axis direction and disposed adjacent to each other, and a detection unit having a detecting part provided in one of the first and second optical systems and a detected part provided in another of the first and second optical systems, the detection unit being configured to detect whether a distance between the first and second optical systems in the optical direction becomes a predetermined distance, wherein the first optical system moves in unison with the second optical system in a first movement section of the first optical system, and only the first optical system moves in a second movement section of the first optical system, the second movement section being provided adjacent to the first movement section.

With the present invention, it is possible to increase the degree of freedom of installation of the detection unit and to make the lens barrel compact in size.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
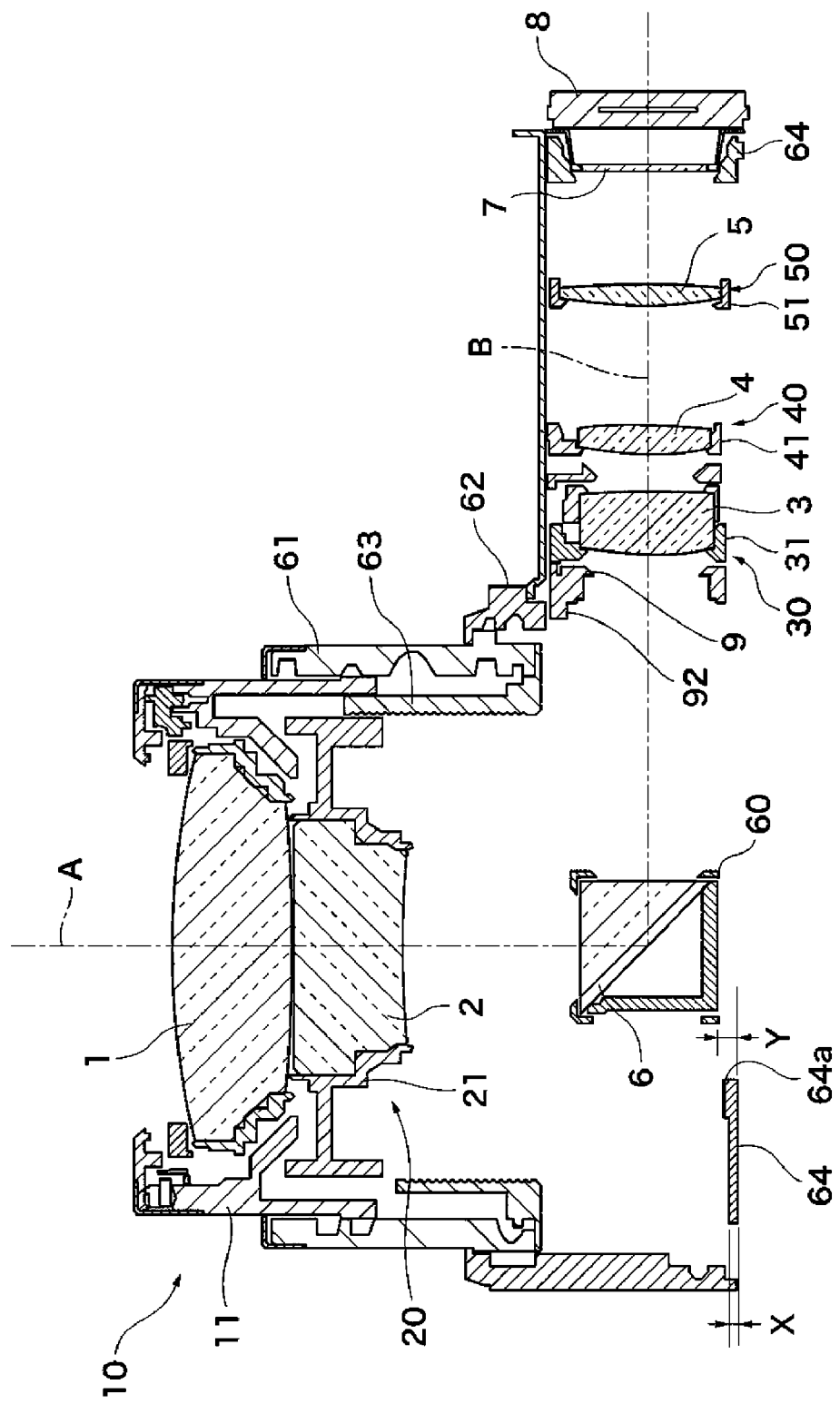
FIG. 1 is a schematic section view showing a lens barrel according to one embodiment of this invention in a state where the lens barrel is at a WIDE position.
Figure 2:
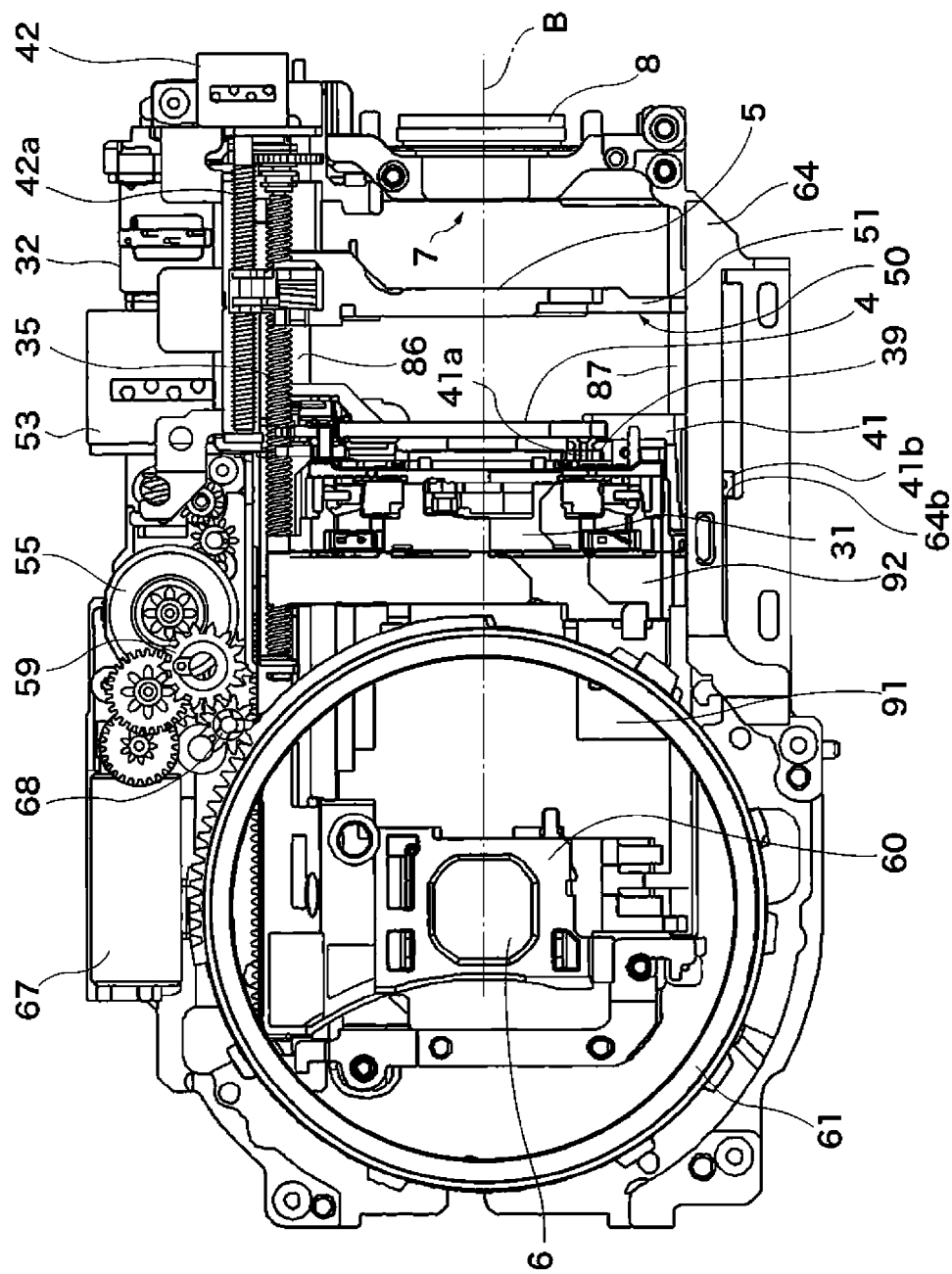
FIG. 2 is a front view showing the lens barrel at the WIDE position as seen from an object side.
Figure 17:
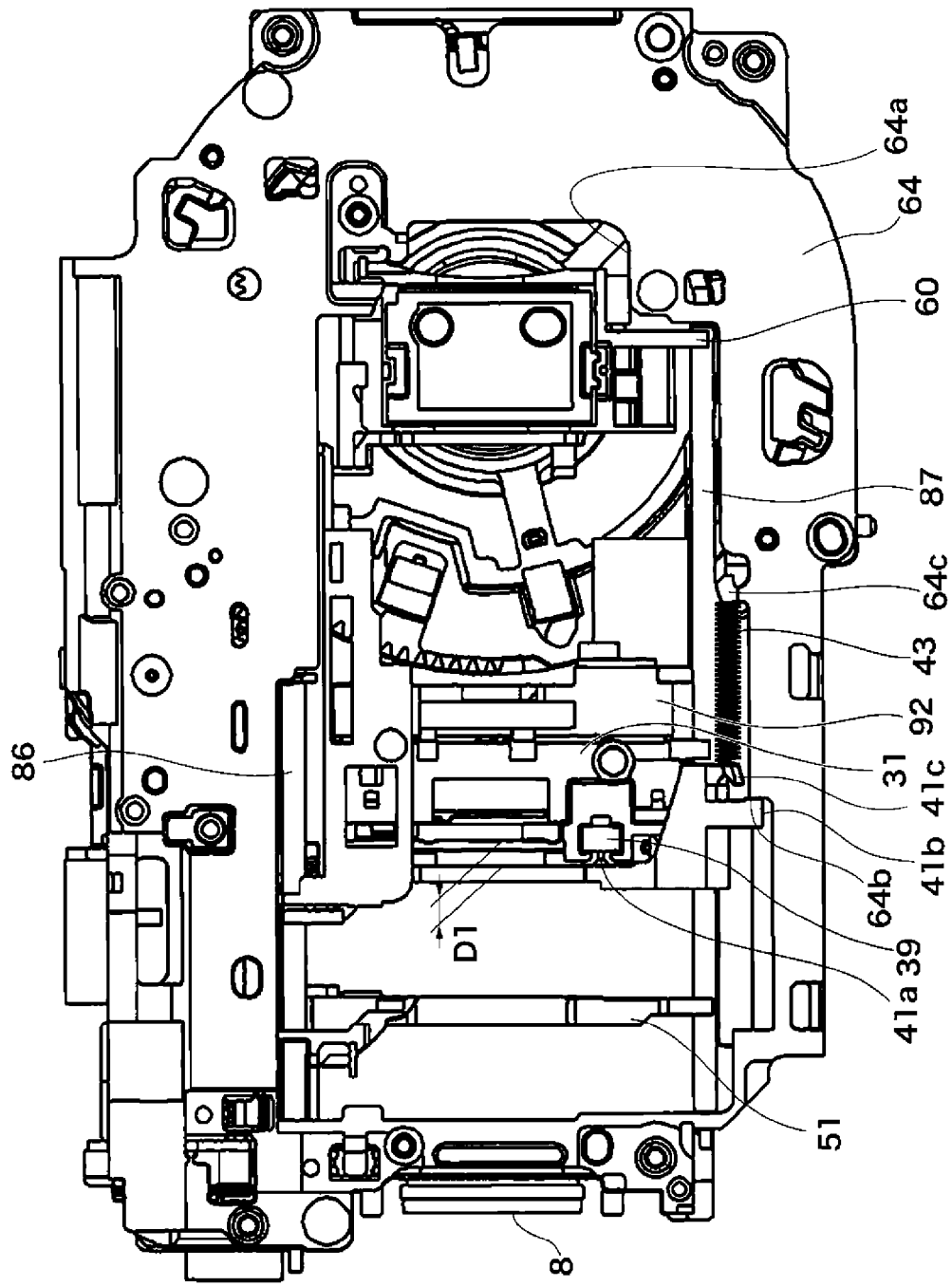
FIG. 17 is a rear view of the lens barrel at the WIDE position as seen from the opposite side of the object.

FIG. 1 schematically shows in cross section a lens barrel according to one embodiment of this invention in a state where the lens barrel is at a WIDE position (wide-angle position). FIG. 2 shows in front view the lens barrel at the WIDE position as seen from an object side (i.e., from an upper side in FIG. 1), and FIG. 17 shows in rear view the lens barrel at the WIDE position as seen from an opposite side of the object.

The lens barrel of this embodiment is a zoom lens barrel mounted on an image pickup apparatus (e.g., a digital camera) and having lens groups movable in an optical direction between a storage position and a photographing position to change photographing magnification.

As shown in FIG. 1, the zoom lens barrel includes a first lens group 10, second lens group 20, prism 6, fixed cylinder 62, cam cylinder 61, rectilinear guide cylinder 63, and zoom body (main body) 64. In FIG. 2, illustrations of the first and second lens groups 10, 20, fixed cylinder 62, and guide cylinder 63 are omitted.

The first lens group 10 has a first group barrel 11 that holds a first group lens 1. The second lens group 20 has a second group barrel 21 that holds a second group lens 2. An incident light flux passing through the first and second group lenses 1, 2 is bent by the prism 6 to a direction of an optical axis B extending perpendicular to an optical axis A of the first and second group lenses 1, 2 and guided to an imaging surface of an image pickup device 8. The prism 6 is held by a holding member 60 which is movable along the optical axis B.

Between the prism 6 and the image pickup device 8, there are disposed an aperture shutter 9, third group lens 3, fourth group lens 4, and optical filter 7 in this order along the optical axis B.

The aperture shutter 9 for controlling an amount of photographing light is fixed to a shutter base plate 92. The shutter base plate 92 is combined integrally with a third group base plate 31 that holds the third group lens 3, thereby constituting a third lens group (first optical system) 30. By the drive of a stepping motor (drive unit) 32 shown in FIG. 2, the third lens group 30 is moved forward and rearward along the optical axis B for a zooming operation.

Figure 3:
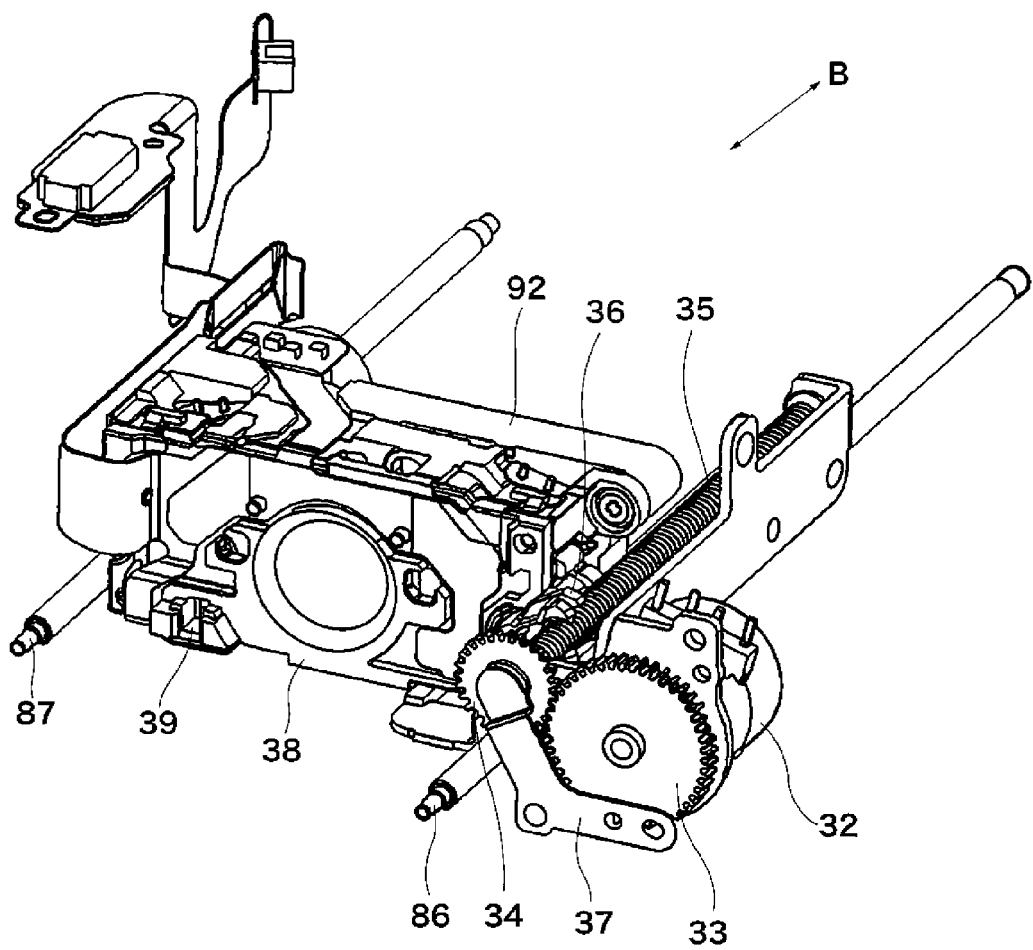
FIG. 3 is a perspective view showing a drive mechanism for a third lens group of the lens barrel.

FIG. 3 shows in perspective view a drive mechanism for the third lens group 30. As shown in FIG. 3, a gear 33 mounted to an output shaft of the stepping motor 32 is in mesh with a gear 34 to rotate a lead screw 35 at an increased speed. A plate spring 37 urges the screw 35 in one direction. The screw 35 is in mesh with a rack 36 attached to the third group base plate 31 of the third lens group 30. The base plate 31 is supported by two guide shafts 86, 87 extending parallel to the optical axis B so as to be movable along the optical axis B. With rotation of the screw 35, the rack 36 and the third lens group 30 move in the direction of the optical axis B. The third group lens 3 is covered by a third group cover 38 fixed to the third group base plate 31 shown in FIGS. 1 and 2, and a photointerrupter (detecting part) 39 is fixed to the third group cover 38 (FIGS. 2 and 3). The cover 38 and the photointerrupter 39 move in unison with the third group base plate 31 in the direction of the optical axis B.

Figure 4:
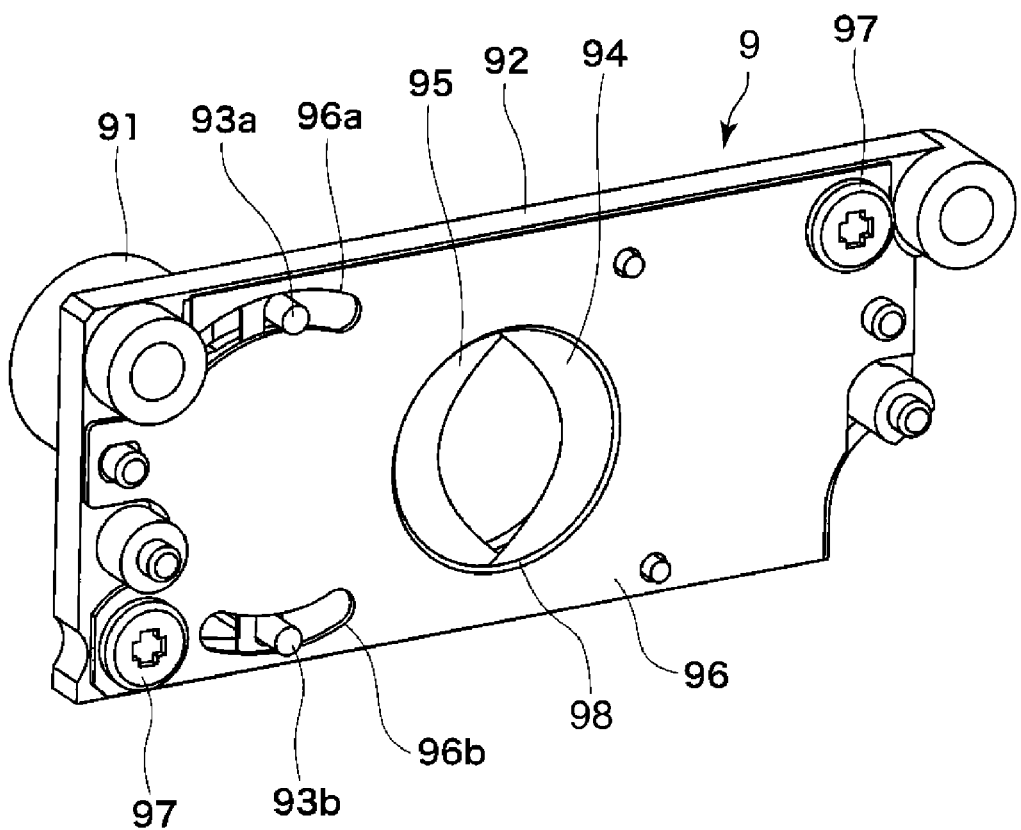
FIG. 4 is a perspective view showing an aperture shutter of the lens barrel.
Figure 5:
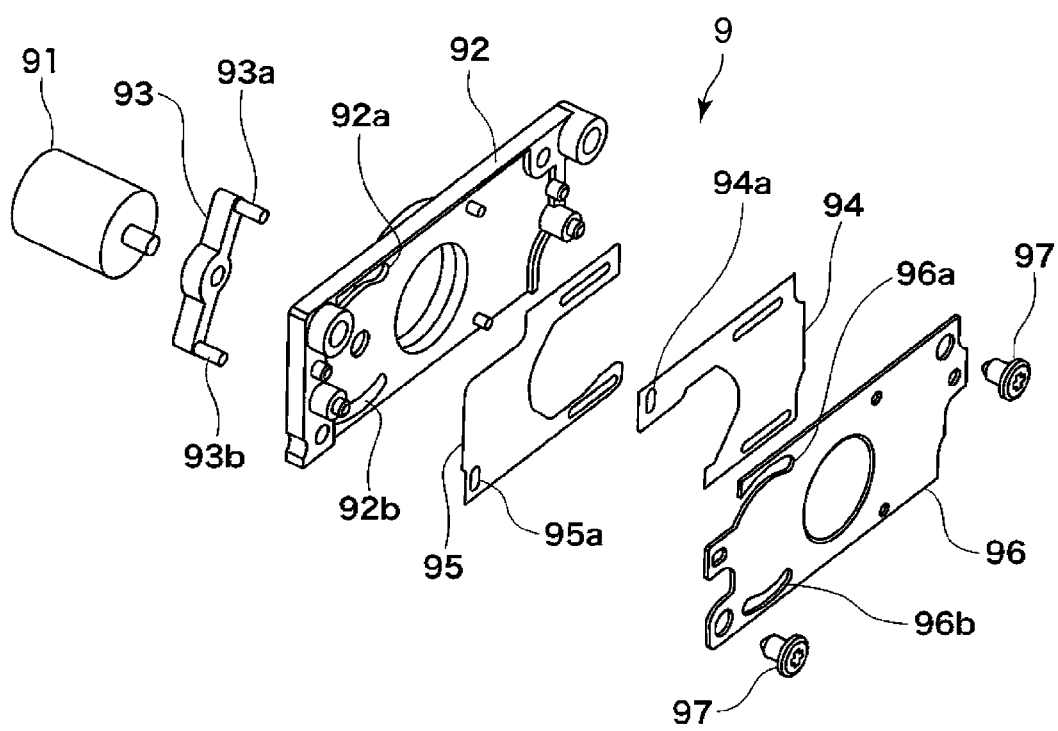
FIG. 5 is an exploded perspective view of the aperture shutter.

FIG. 4 shows the aperture shutter 9 in perspective view, and FIG. 5 shows the aperture shutter 9 in exploded perspective view. As shown in FIGS. 4 and 5, the aperture shutter 9 includes a shutter base plate 92, a cover 96 disposed on the side of the third group base plate 31, and blades 94, 95 for opening and closing an aperture 98. The blades 94, 95 are disposed between the cover 96 and the shutter base plate 92 that are fixed together by screws 97.

A stepping motor 91 is an actuator for opening and closing the blades 94, 95 of the aperture shutter 9, and a lever 93 is attached to a motor shaft of the stepping motor 91 and extends in a direction perpendicular to an axis of the motor shaft. Shafts 93a, 93b are protrudingly provided at opposite ends of the lever 93.

The shaft 93a is inserted through an arcuate hole 92a formed in the shutter base plate 92, an elongated hole 94a formed in the blade 94, and an arcuate hole 96a formed in the cover 96, and is movable along the arcuate holes 92a, 96a. The shaft 93b is inserted through an arcuate hole 92b formed in the shutter base plate 92, an elongated hole 95a formed in the blade 95, and an arcuate hole 96b formed in the cover 96, and is movable along the arcuate holes 92b, 96b.

With rotation of the lever 93 by the drive of the stepping motor 91, the blades 94, 95 rotate in opposite directions, and the aperture 98 is opened and closed by the reciprocal rotations of the blades 94, 95. An aperture function for controlling an amount of photographing light is realized by adjusting a gap between the blades 94, 95, and a shutter function is realized by moving the blades 94, 95 from a state where the aperture 98 is open to a state where the aperture 98 is closed.

Figure 19:
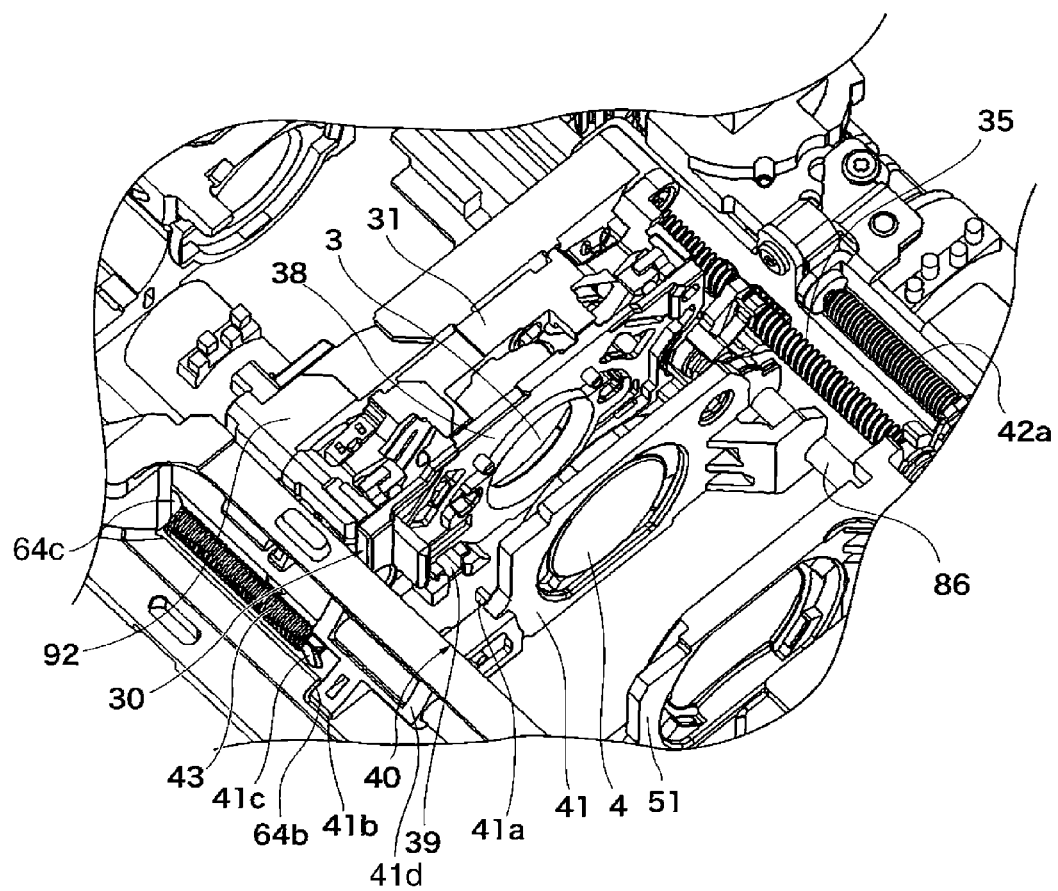
FIG. 19 is a perspective view showing third and fourth lens groups and their surroundings in a state where the lens barrel is at near the WIDE position.

FIG. 19 shows in perspective view the third lens group 30, a fourth lens group, and their surroundings in a state where the lens barrel is at near the WIDE position (wide-angle position). As shown in FIGS. 1 and 19, the fourth lens group (second optical system) 40 is constituted by the fourth group lens 4 held by a fourth group lens holder 41. The fourth lens group 40 is supported by the guide shafts 86, 87 so as to be movable in the direction of the optical axis B. The third and fourth lens groups 30, 40 are disposed adjacent to each other and movable along the same optical axis B.

A light shield plate (detected part) 41a shown in FIG. 19 is formed integrally with the fourth group lens holder 41. The light shield plate 41a for light-shielding the photointerrupter 39 cooperates with the photointerrupter 39 to constitute a detection unit. The photointerrupter 39 includes a light emitting device (not shown) such as an LED and a light receiving sensor 39a (FIGS. 20A to 20C) disposed opposite to the light emitting device for receiving light emitted from the light emitting device. The photointerrupter 39 obtains, as a detection signal, an electrical signal that varies according to an amount of light received by the light receiving sensor 39a. When a light path between the light emitting device and the light receiving sensor 39a is intercepted by the light shield plate 41a, the light receiving sensor 39a is prevented from receiving light.

As shown in FIGS. 2 and 19, the fourth group lens holder 41 has a sleeve portion 41d thereof supported by the guide shaft 87 and an arm portion 41b thereof extending from the sleeve portion 41d. The zoom body 64 is formed with a stopper portion (restriction part) 64b.

As shown in FIG. 19, a tension coil spring (urging unit) 43 is disposed between a pawl 64c of the zoom body 64 and a pawl 41c of the fourth group lens holder 41. The lens holder 41 is always urged by the tension spring 43 toward the third lens group 30, i.e., toward the prism 6 in the direction of the optical axis B. At the time of photographing, the arm portion 41b of the lens holder 41 is brought to abut against the stopper portion 64b of the zoom body 64. In other words, the lens holder 41 is urged to assume a movable limit position (shown in FIGS. 1, 2, and 17) close to the prism 6.

When the third lens group 30 is driven by the stepping motor 32 (FIG. 2), the third and fourth lens groups 30, 40 integrally move from a storage position (SINK position). Subsequently, the fourth lens group 40 stops moving and the third lens group 30 moves singly.

More specifically, in a movement stroke starting from the SINK position serving as a start position, the third lens group 30 is driven by the stepping motor 32. Abutment between the third and fourth lens groups 30, 40 is maintained by the tension of the tension spring 43 while the fourth lens group 40 moves from the SINK position to a halfway position in the direction of the optical axis B at which the arm portion 41b of the fourth lens group 40 is brought to abut against the stopper portion 64b (see FIG. 2) of the zoom body 60. In other words, when the third lens group 30 moves toward the prism 6, the fourth lens group 40 is moved in unison with the third lens group 30 by the tension of the tension spring 43. After the arm portion 41b of the fourth lens group 40 abuts against the stopper portion 64b of the zoom body 60, the fourth lens group 40 stops moving at the abutment position, and only the third lens group 30 moves toward the prism 6 up to a TELE position (telephoto position).

On the other hand, in a stroke where the third lens group 30 moves toward the image pickup device 8, the third lens group 30 moves singly until it is brought to abut against the fourth lens group 40. After abutting against the lens group 40, the third lens group 30 presses the fourth lens group 40 against the tension of the tension spring 43, so that the third and fourth lens groups 30, 40 integrally move toward the image pickup device 8 up to the SINK position.

Figures 20A, 20B, 20C:
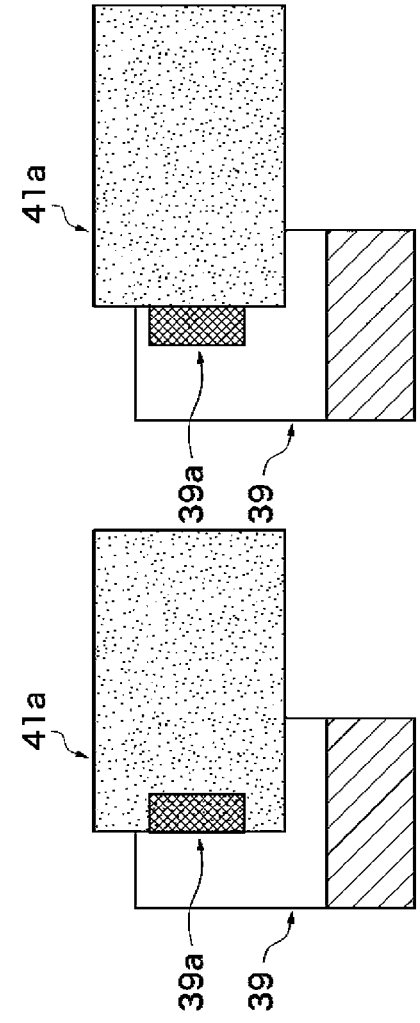
FIGS. 20A to 20C are views schematically showing a relative relation between a photointerrupter and a light shield plate.

FIGS. 20A to 20C schematically show relative relations of the photointerrupter 39 and the light shield plate 41a. Since the photointerrupter 39 moves in unison with the third lens group 30 and the light shield plate 41a moves in unison with the fourth lens group 40, the degree of interception of light directed toward the photointerrupter 39 by the light shield plate 41a varies according to a distance between the third and fourth lens groups 30, 40. When the amount of light received by the light receiving sensor 39a of the photointerrupter 39 crosses a threshold value, an electrical output from the photo interrupter 39 is switched and a change in relative positions of the third and fourth lens groups 30, 40 is detected.

In a region from the SINK position to near the WIDE position, the distance (shown by symbol D1 in FIGS. 15, 17, and 18) between the third and fourth lens groups 30, 40 is shorter than a predetermined distance. In that region, the light shield plate 41a intercepts light emitted from the light emitting device of the photointerrupter 39, thereby preventing the light from being received by the light receiving sensor 39a, as shown in FIG. 20A.

The state shown in FIG. 20A is assumed immediately after the arm portion 41b of the fourth lens group 40 is brought to abut against the stopper portion 64b of the zoom body 64 in the stroke where the third lens group 30 moves toward the TELE position (telephoto position). FIG. 20B shows a state (reset position) where the third lens group 30 further moves toward the prism 6 from the state shown in FIG. 20A, and FIG. 20C shows a state where the third lens group 30 is moved up to the TELE position.

As shown in FIG. 1, a fifth lens group 50 is constituted by a fifth group lens 5 held by a fifth group lens holder 51. As shown in FIG. 2, the fifth lens group 50 is supported by the guide shafts 86, 87 so as to be movable in the direction of the optical axis B. By rotating a screw 42a by the drive of a stepping motor 42, the fifth lens group 50 is moved forward and rearward along the optical axis B for a zooming operation and a focusing operation. An optical filter 7 has a lowpass filter function for cutting light having a high spatial frequency and a function for cutting infrared light.

Figure 6:
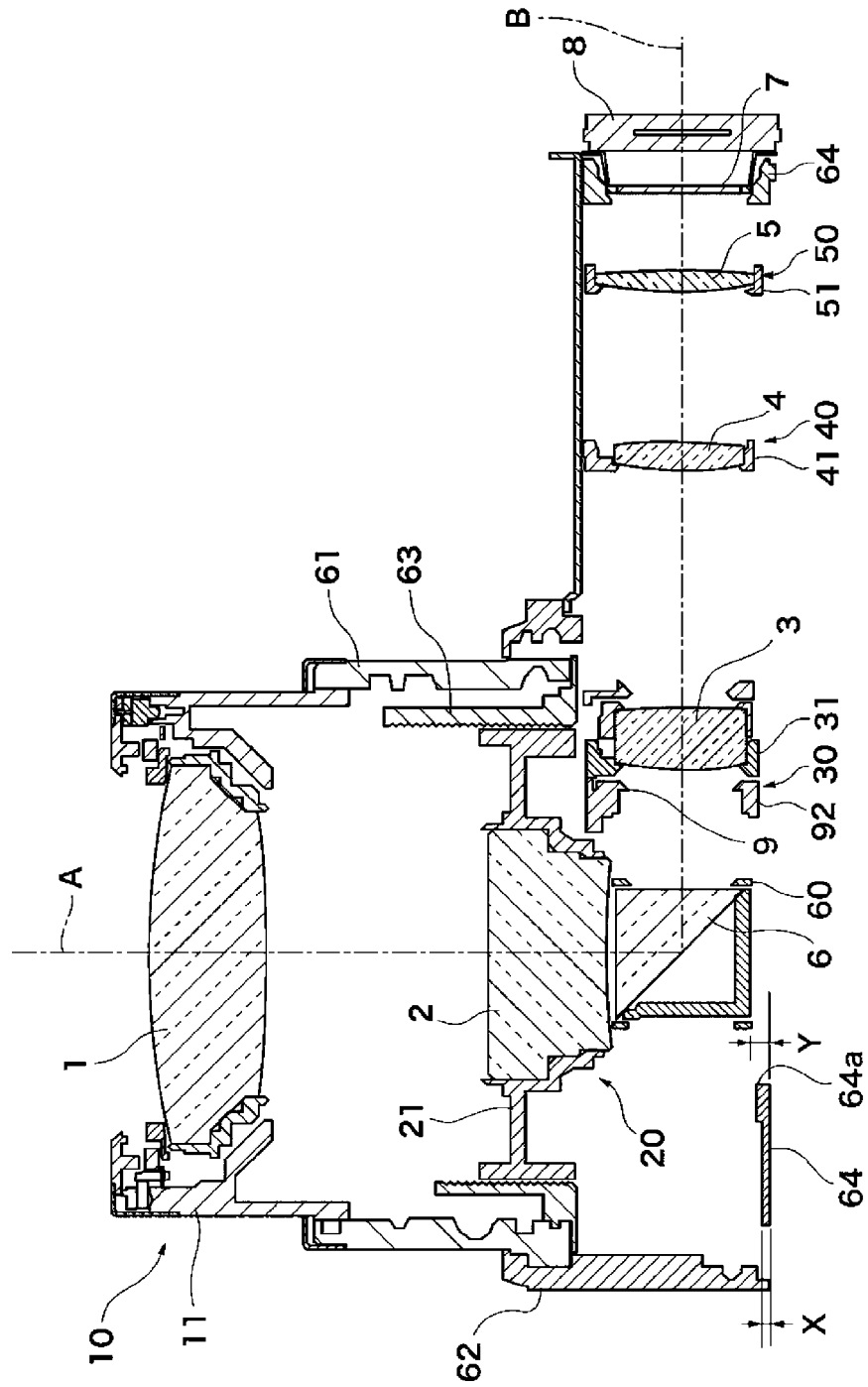
FIG. 6 is a section view showing a state where the lens barrel is at a TELE position.
Figure 7:
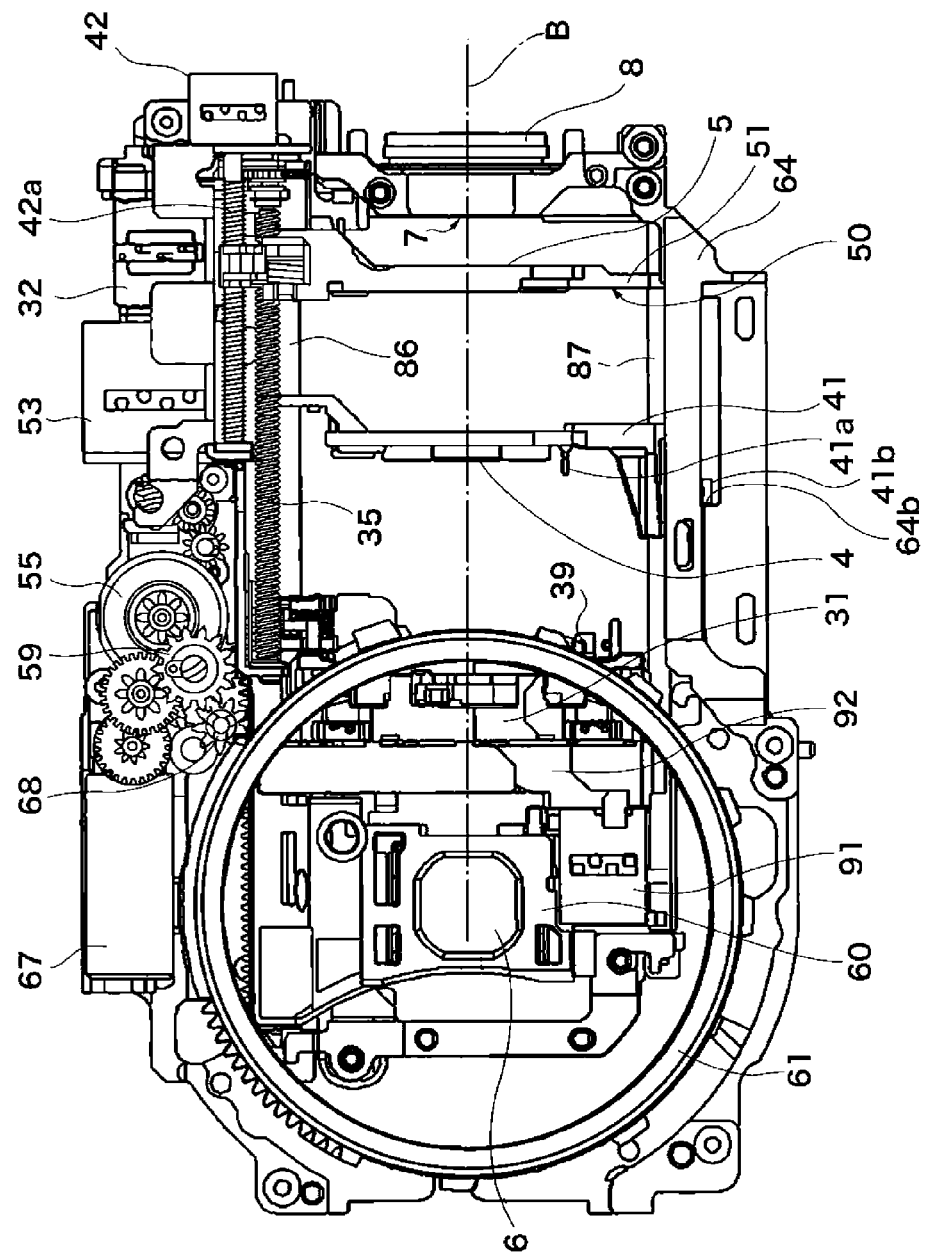
FIG. 7 is a front view showing the lens barrel at the TELE position as seen from the object side.
Figure 18:
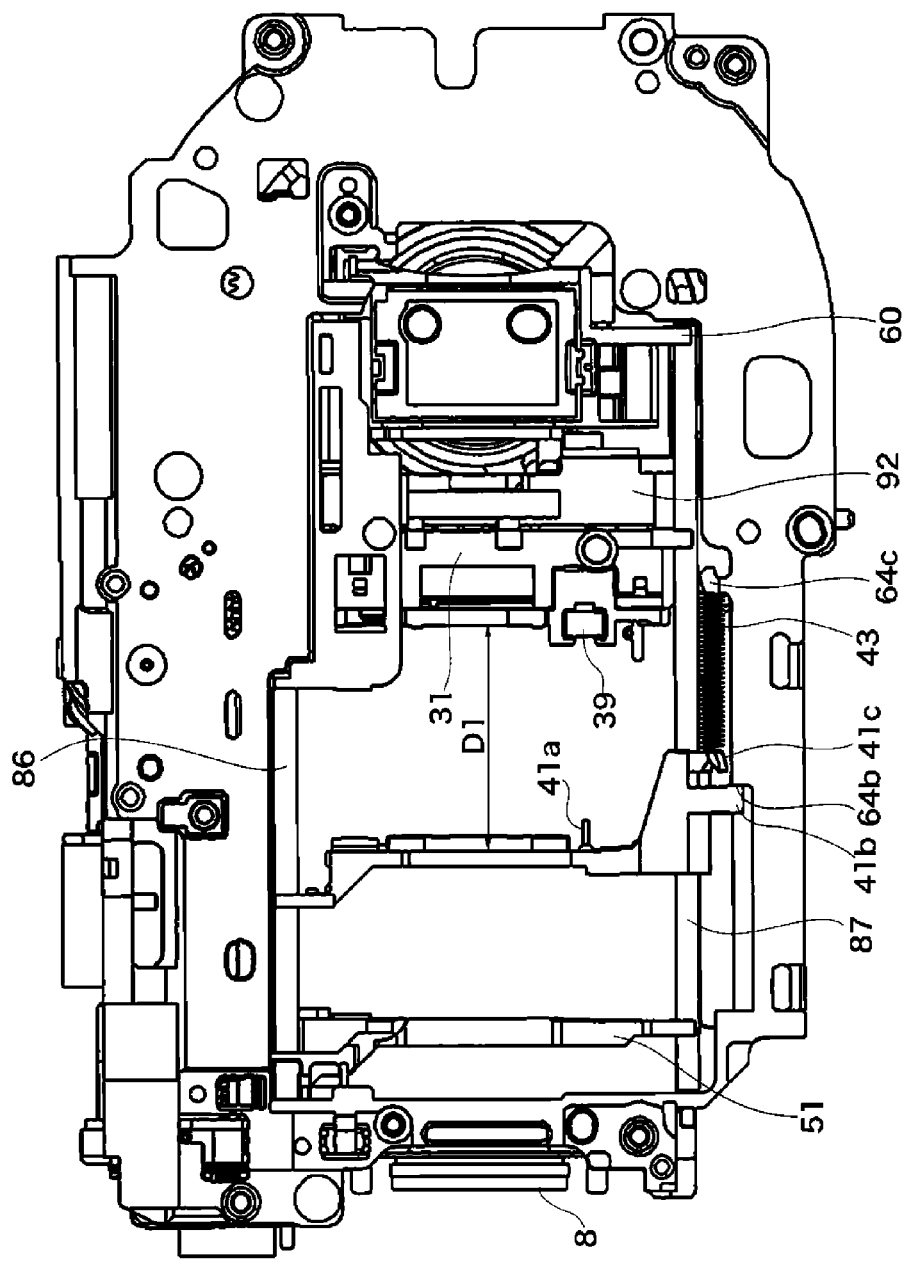
FIG. 18 is a rear view of the lens barrel at the TELE position as seen from the opposite side of the object.

FIG. 6 shows in cross section a state where the lens barrel is at the TELE position (telephoto position), and FIG. 7 shows the lens barrel at the TELE position in front view as seen from the object side in the direction of the optical axis A. In FIG. 7, illustrations of the first and second lens groups 10, 20, fixed cylinder 62, and rectilinear guide cylinder 63 are omitted. FIG. 18 shows a state where the lens barrel is at the TELE position in rear view as seen from the opposite side of the object in the direction of the optical axis A.

To position the lens barrel at the TELE position shown in FIGS. 6 and 7, the first lens group 10 is moved forward toward the object along the optical axis A and the second lens group 20 is moved rearward along the optical axis A and stopped at near the prism 6. At that time, the third lens group 30 is moved toward the prism 6 along the optical axis B by the drive of the stepping motor 32 and stopped at near the prism 6.

The fourth lens group 40 does not move but remains stopped, with its arm portion 41b abutted against the stopper portion 64b of the zoom body 64, since before the lens barrel assumes the WIDE position (wide-angle position). Thus, the third lens group 30 is moved away from the fourth lens group 40 by the drive of the stepping motor 32, and the photointerrupter 39 moves together with the third lens group 30. On the other hand, the light shield plate 41a does not move. Accordingly, after the third lens group 30 starts moving from the WIDE position toward the TELE position, a light-shielded state of the light receiving sensor 39a by the light shield plate 41a is gradually canceled as shown in FIG. 20B.

A control unit (not shown) is provided that controls operations of the image pickup apparatus. Based on the output from the photointerrupter 39, the control unit detects a timing of changeover from the light-shielded state to the light-shield released state. While using the light-shield state changeover position (short of the reset position) as a reference, the control unit counts subsequent pulses output from the stepping motor 32, thereby detecting a relative positional relation between the third and fourth lens groups 30, 40 and detecting an absolute position of the third lens group 30.

At the reset position, the distance D1 between the third and fourth lens groups 30, 40 becomes equal to the predetermined distance. On the other hand, positions of the lens groups 30, 40 in the direction of the optical axis B are known, which are assumed by the lens groups 30, 40 when the arm portion 41b of the fourth lens group 40 is brought in contact with or out of contact with the stopper portion 64b (i.e., assumed at the position short of the reset position). It is therefore possible to detect the absolute position of the third lens group 30 starting from the storage position, while using as a reference the position of the third lens group 30 assumed when the distance D1 becomes equal to the predetermined distance. The positions of the lens groups 30, 40 shown in FIGS. 15, 17, and 18 which are used to define the distance D1 between the third and fourth lens groups 30, 40 are an example and not limitative.

In the following, the term "first movement section" will refer to, among a movement section of the third lens group 30, a section extending from the SINK position at which the third lens group 30 starts moving to a position (short of the reset position) at which the arm portion 41b of the fourth lens group 40 moving together with the third lens group 30 is brought to abut against the stopper portion 64b. In the first section, the third lens group 30 moves in unison with the fourth lens group 40. The term "second movement section" will refer to, among the movement section of the third lens group 30, a section extending to the TELE position from the end position of the first movement section at which the arm portion 41b is brought to abut against the stopper portion 64b. The second movement section is adjacent to the first movement section. In the second movement section, the fourth lens group 40 stops moving and the third lens group 30 moves singly. The reset position is included in the second movement section.

In the movement stroke where the third lens group 30 moves toward the prism 6 from the reset position to the TELE position, the photointerrupter 39 is not light-shielded.

As shown in FIG. 7, when the lens barrel is at the TELE position, the stepping motor 91 is disposed under the prism 6 and aligned in position with the prism 6 as viewed in the direction of the optical axis B. The fifth lens group 50 is moved by the drive of the stepping motor 42 toward the image pickup device 8 along the optical axis B. When the lens barrel is at the TELE position, the fifth lens group 50 stops moving at a position close to the image pickup device 8.

Figure 8:
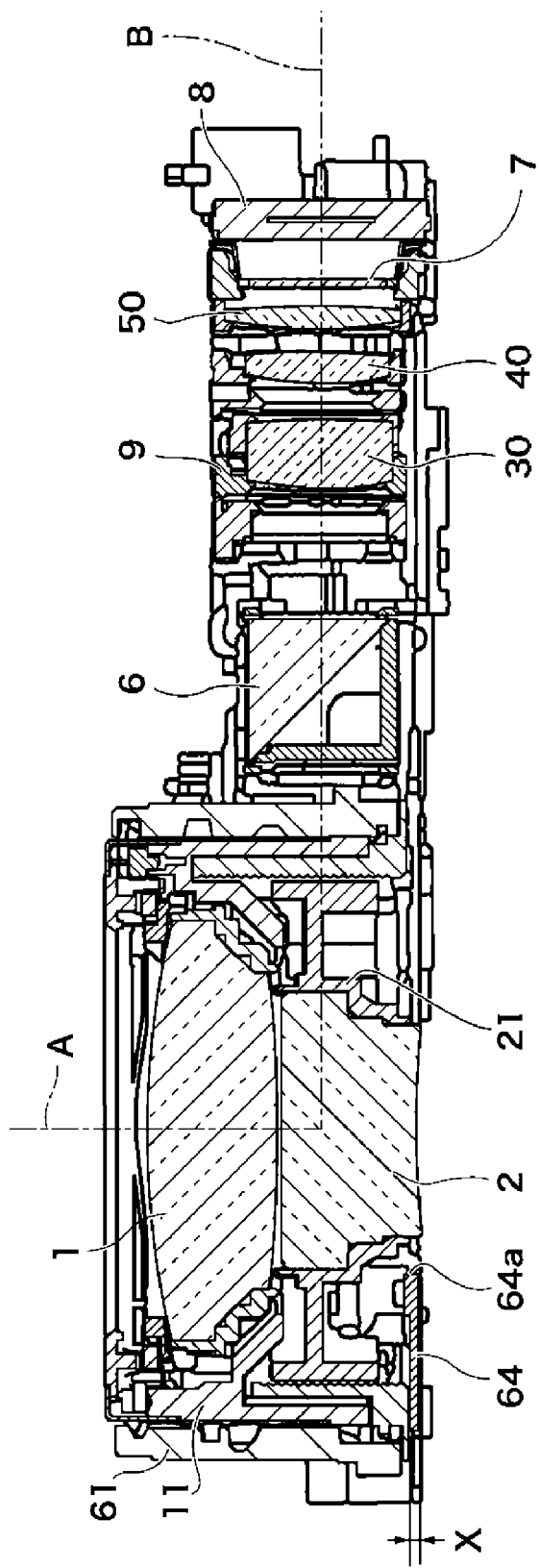
FIG. 8 is a section view showing a state where the lens barrel is at a SINK position.
Figure 9:
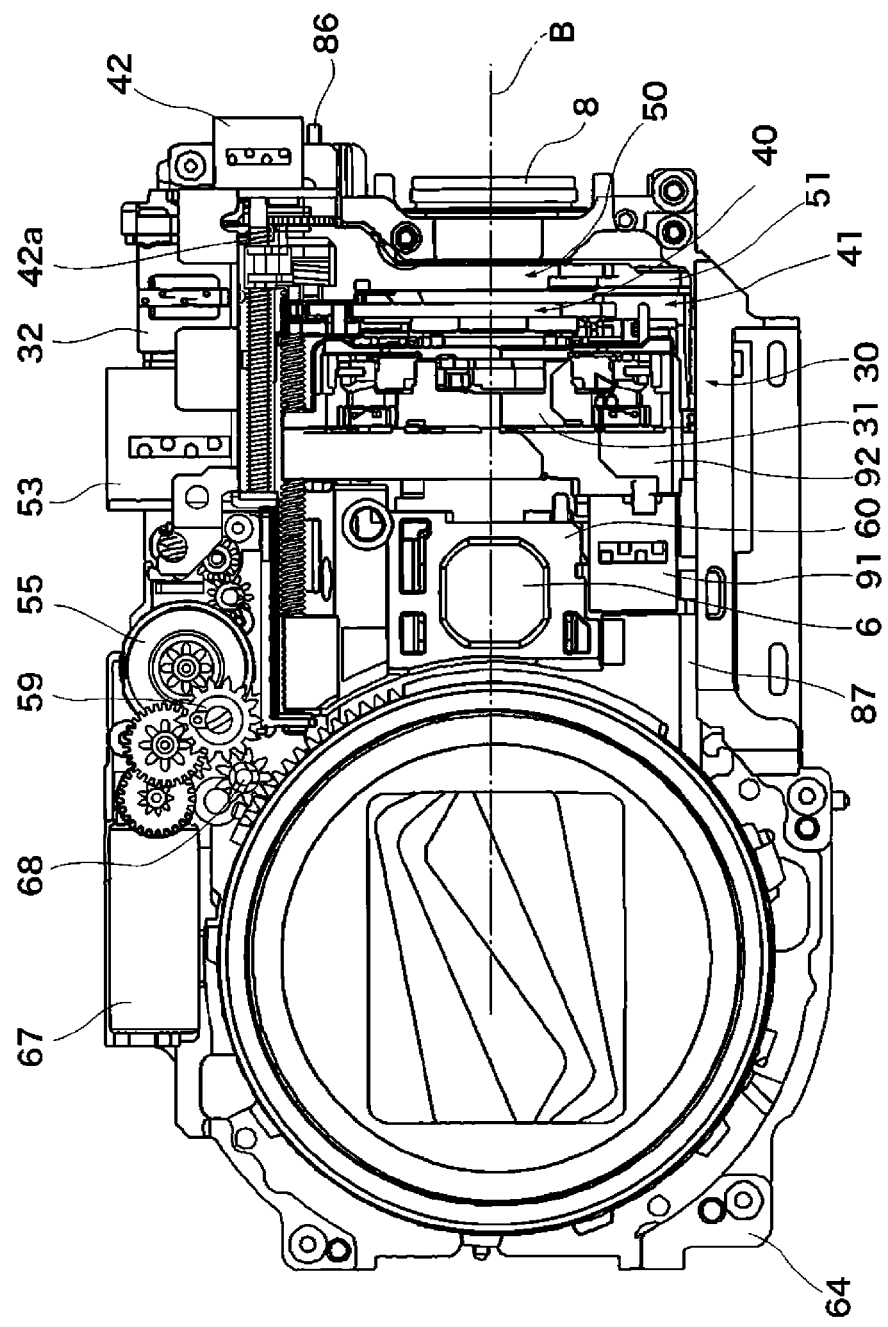
FIG. 9 is a front view showing the lens barrel at the SINK position as seen from the object side.
Figure 15:
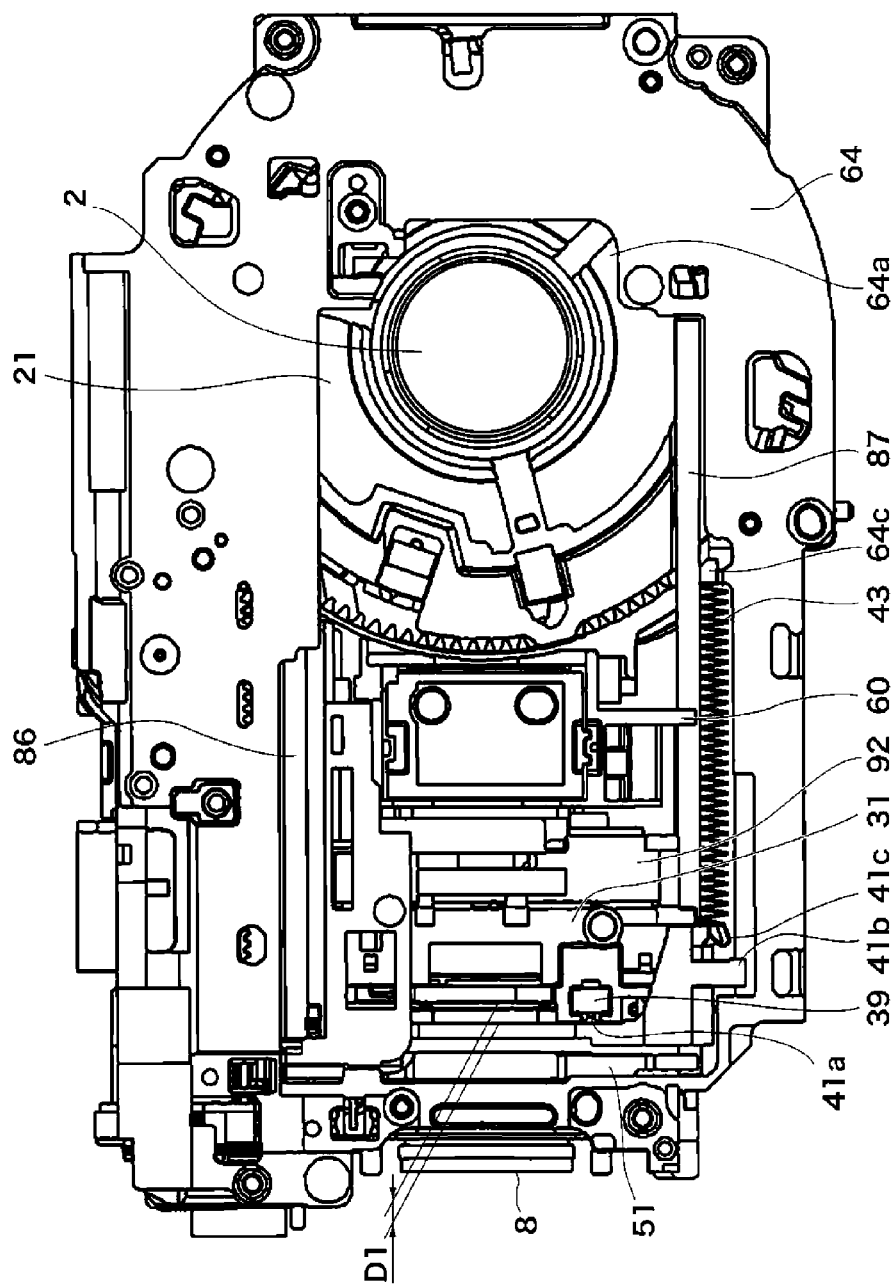
FIG. 15 is a rear view showing a state where the lens barrel is at the SINK position as seen from an opposite side of the object.
Figure 16:
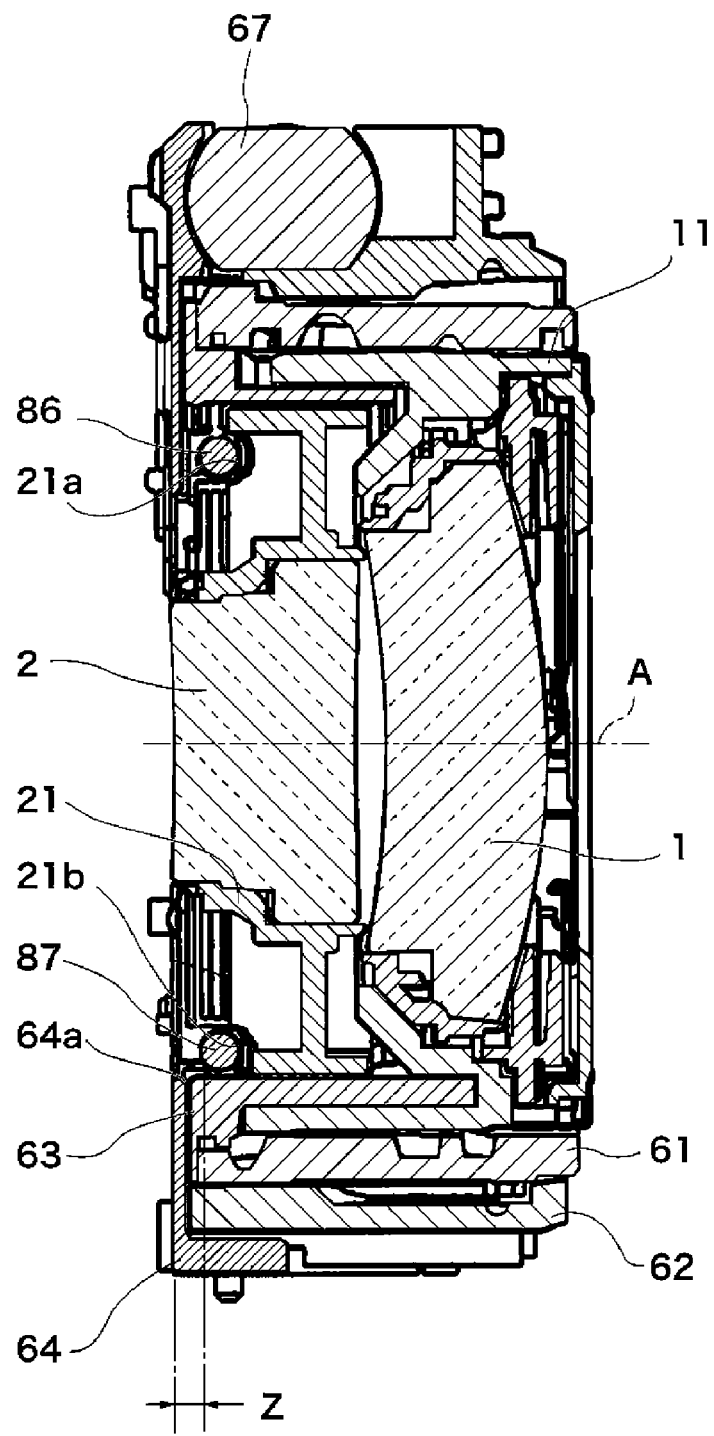
FIG. 16 is a section view showing a state where the lens barrel is at the SINK position.

FIG. 8 shows in cross section a state where the lens barrel is at the SINK position (storage position). FIG. 9 shows in front view the lens barrel at the SINK position as seen from the object side in the direction of the optical axis A. FIG. 15 shows in rear view a state where the lens barrel is at the SINK position as seen from the opposite side of the object in the direction of the optical axis A. FIG. 16 shows in cross section a state where the lens barrel is at the SINK position as viewed in a direction perpendicular to the optical axis B.

When the lens barrel is at the SINK position, the prism 6 and the third and fifth lens groups 30, 50 are located at positions close to the image pickup device 8 in the direction of the optical axis B as shown in FIGS. 8 and 9 so as not interfere with one another. When the lens barrel is retracted to the SINK position, the fourth lens group 40 is pressed by the third lens group 30 and retracted up to the SINK position (retracted position). From the WIDE position to the SINK position, the photointerrupter 39 is kept light-shielded by the light shield plate 41*a*. When the prism 6 is moved up to the SINK position, a storage space is formed at the rear of the first and second lens groups 10, 20.

The zoom body 64 fixedly holds the two guide shafts 86, 87 and the optical filter 7 (FIG. 9). As shown in FIG. 15, respective one end portions of the guide shafts 86, 87 extend to positions where they overlap the second group barrel 21 inside the cam cylinder 61, and the other end portions of the guide shafts extend to positions where they hold the optical filter 7 (FIG. 2).

The zoom body 64 holds the fixed cylinder 62 at the object side in the direction of the optical axis A (FIGS. 1 and 16) and holds a group of gear trains (described later). In FIGS. 1, 6 and 8, symbol X represents a thickness (in the direction of the optical axis A) of a portion of the zoom body 64 on which the fixed cylinder 62, the cam cylinder 61, etc. are mounted.

In FIGS. 1 and 6, symbol Y represents a size (in the direction of the optical axis A) from an outer surface of the zoom body 64 to an outer surface of the prism holding member 60. The size Y is larger than the thickness X.

The zoom body 64 is formed with a hole 64*a*. A space having a depth corresponding to the size Y is formed by the hole 64*a* along the optical axis A on the opposite side of the object with respect to a space in which the prism 6 is positioned at the time of photographing. When the lens barrel is brought into the SINK position, the first and second lens groups 10, 20 are moved rearward along the optical axis A and stored into a storage space defined by the just-mentioned spaces.

As shown in FIG. 16, the second group barrel 21 is formed with grooves 21*a*, 21*b*, so that the barrel 21 does not interfere with the guide shafts 86, 87. The second group lens 2 is stored between the guide shafts 86, 87 such that a surface of the lens 2 on the opposite side of the object (i.e., the left-side surface of the lens 2 in FIG. 16) is located rearward than the guide shafts 86, 87 by a size represented by symbol Z as viewed in the direction of the optical axis A. The size Z is a distance between an outer surface of the zoom body 64 and outer peripheral surfaces of the guide shafts 86, 87.

As shown in FIG. 9, the stepping motor 91 is disposed under the prism 6 and aligned in position with the prism 6 as viewed in the direction of the optical axis B when the lens barrel is at the SINK position.

Figure 10:
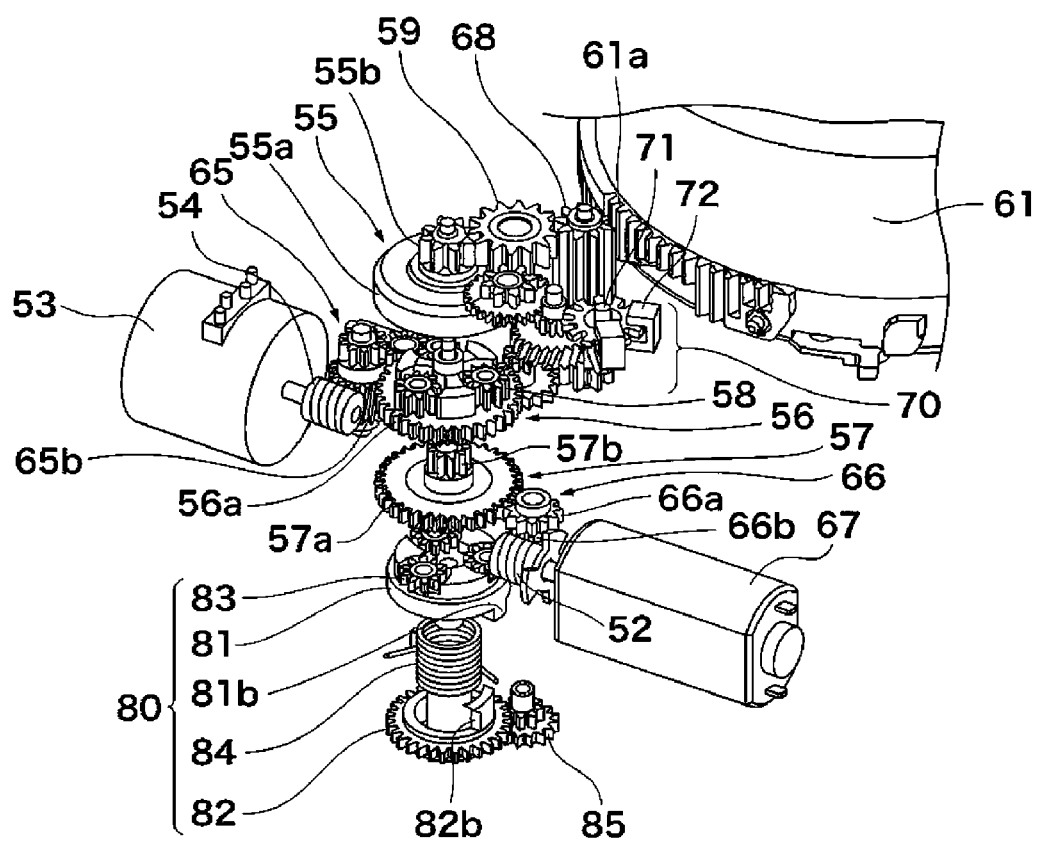
FIG. 10 is a perspective view showing a drive mechanism for a cam cylinder and a prism of the lens barrel.
Figure 12:
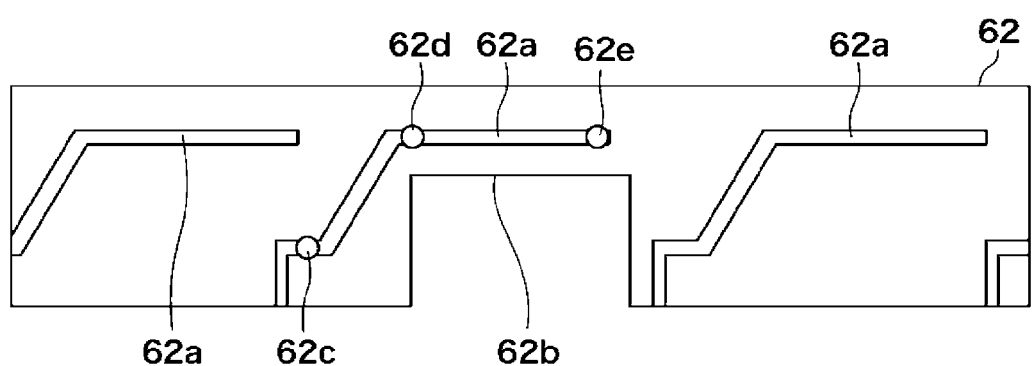
FIG. 12 is an development view showing an inner peripheral surface of a fixed cylinder of the lens barrel.

The following is a description of the cam cylinder 61, fixed cylinder 62, and rectilinear guide cylinder 63. As shown in FIG. 12, cam grooves 62*a*, with which cam pins (one of which at different positions is shown by circles in FIG. 12) formed on an outer peripheral surface of the cam cylinder 61 are engaged, are formed circumferentially at equal intervals on an inner peripheral surface of the fixed cylinder 62. As shown in FIG. 10, the cam cylinder 61 is formed at its outer peripheral surface with a gear which is engaged with a drive gear 68. When rotatably driven by a driving force of the drive gear 68, the cam cylinder 61 is moved forward or rearward along the optical axis A by a cam function between the cam pins of the cam cylinder 61 and the cam grooves 62*a* of the fixed cylinder 62.

As shown in FIG. 1, the rectilinear guide cylinder 63 is disposed inside the cam cylinder 61. The cylinder 63 is rotatable in unison with the cam cylinder 61 and movable in the direction of the optical axis A. The first group barrel 11 of the first lens group 10 has its end portion located on the opposite side of the object and disposed, in a radial direction of the cam cylinder 61, between the cam cylinder 61 and the guide cylinder 63. On the outer peripheral surface of the first group barrel 11 of the first lens group 10, there is formed a cam pin which is engaged with a first group cam groove (not shown) formed on an inner peripheral surface of the cam cylinder 61. On the outer peripheral surface of the rectilinear guide cylinder 63, there is formed a rectilinear groove (not shown) which extends in the direction of the optical axis A and with which a protrusion formed on the inner peripheral surface of the first group barrel 11 is engaged, whereby a rotational motion of the barrel 11 is restricted.

The second lens group 20 is disposed inside the rectilinear guide cylinder 63. The second group barrel 21 of the second lens group 20 is formed with a cam pin (not shown) that is engaged with a second group cam groove (not shown) formed on the inner peripheral surface of the cam cylinder 61. The rectilinear guide cylinder 63 is formed with a penetration groove (not shown) which extends in the direction of the optical axis A and with which an engagement portion at a root of the cam pin of the second group barrel 21 is engaged, whereby a rotational motion of the barrel 21 is restricted.

With rotation of the cam cylinder 61, the first group barrel 11 forwardly or rearwardly moves relative to the cam cylinder 61 along the optical axis A by a cam function between the first group cam groove of the cam cylinder 61 and the cam pin of the first group barrel 11, while a protrusion of the barrel 11 slides along the rectilinear groove of the rectilinear guide cylinder 63 in the direction of the optical axis A. Accordingly, when the cam cylinder 61 moves relative to the fixed cylinder 62 along the optical axis A, the first group barrel 11 moves relative to the cam cylinder 61 along the optical axis A, so that the first group lens 1 moves between the storage position and the photographing position (i.e., between the WIDE position and the TELE position). Similarly, the second group lens 2 moves between the storage position and the photographing position.

Next, a drive mechanism for the cam cylinder 61 and the prism 6 will be described with reference to FIGS. 10 and 14. FIG. 10 shows the drive mechanism for the cam cylinder 61 and the prism 6 in perspective view, and FIG. 14 shows the drive mechanism for the cam cylinder 61 in perspective view.

Referring to FIG. 10, the drive mechanism includes a SW motor 67 serving as a drive source for moving the first and second lens groups 10, 20 between the SINK position and the WIDE position, and a TW motor 53 serving as a drive source for moving the first and second lens groups 10, 20 between the TELE position and the WIDE position. The SW motor 67 and the TW motor 53 are disposed such that motor shafts thereof extend toward radially inward of the cam cylinder 61 in the direction of the optical axis B. The TW motor 53 is disposed closer to the object than the SW motor 67. Worm gears 52, 54 are press-fitted to the motor shafts of the SW motor 67 and the TW motor 53, respectively.

Figure 14:
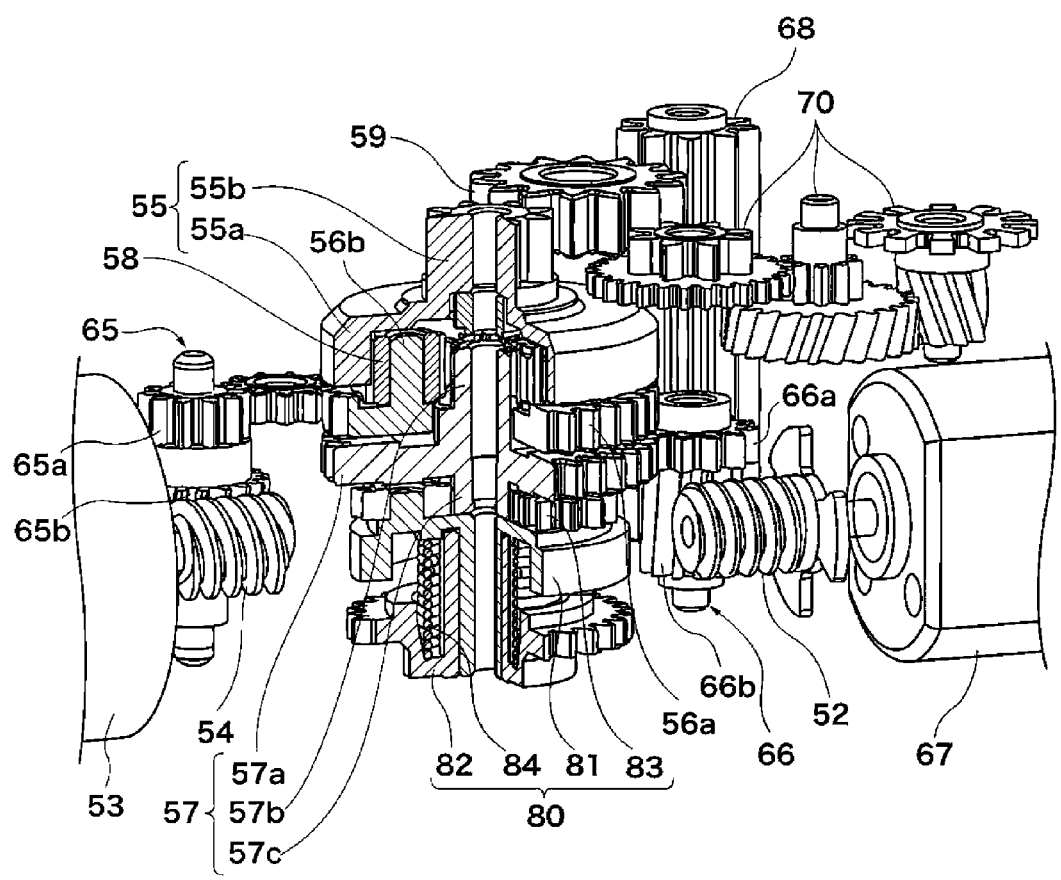
FIG. 14 is a perspective view showing a drive mechanism for the cam cylinder.

As shown in FIGS. 10 and 14, between the worm gears 52 and 54, there are disposed a zoom ring gear 55, zoom carrier gear 56, and sun gear train 57 in this order as viewed from the object side along the optical axis A so as to be coaxial with one another. The sun gear train 57 is comprised of sun gears 57a, 57b, and 57c (three-stage spur gears).

A SW-side gear assembly 66 includes a spur gear 66a disposed on the object side and a helical gear 66b disposed on the opposite side of the object. The spur gear 66a is in mesh with the sun gear 57a, and the helical gear 66b is in mesh with the worm gear 52.

The zoom carrier gear 56 includes a gear portion 56a and three shaft portions 56b formed on an object-side surface of the gear portion 56a at circumferentially equal intervals so as to project toward the object. The shaft portions 56b rotatably support respective ones of zoom planetary gears 58 that are in mesh with the sun gear 57b.

A TW-side gear assembly 65 includes a spur gear 65a disposed on the object side and a helical gear 65b disposed on the opposite side of the object. The helical gear 65b is in mesh with the worm gear 54, and the spur gear 65a is in mesh with the gear 56a through a spur gear.

The zoom ring gear 55 has an internal gear 55a and an external gear 55b. The internal gear 55a is in mesh with the zoom planetary gears 58, the external gear 55b is in mesh with the drive gear 68 through an idler gear 59, and the drive gear 68 is in mesh with a gear portion 61a of the cam cylinder 61.

The following is a description of a prism drive unit 80. As shown in FIGS. 10 and 14, the prism drive unit 80 includes a prism carrier 81, torsion spring 84, and prism delay gear 82 which are disposed coaxially with the sun gear train 57 on the opposite side of the object with respect to the sun gear train 57. The prism delay gear 82 is rotatably supported by the prism carrier 81.

On an object-side surface of the prism carrier 81, three shaft portions are formed at circumferentially equal intervals so as to project toward the object. Prism planetary gears 83 are rotatably supported by these shaft portions, respectively, and in mesh with the sun gear 57c and an internal gear fixed to a gear base plate (not shown).

Figure 13A:
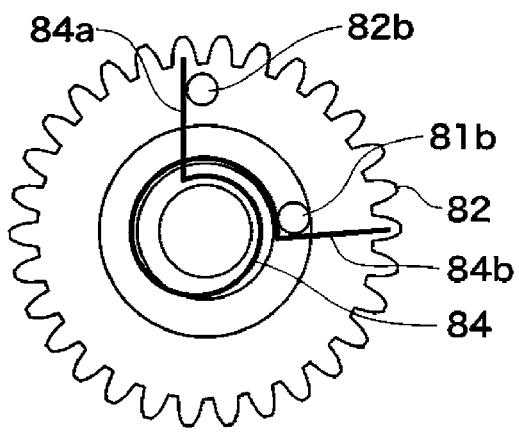
FIGS. 13A to 13C are views showing a phase relation between a prism carrier and a prism delay gear and showing an amount of charge of a torsion spring in the lens barrel.
Figure 13B:
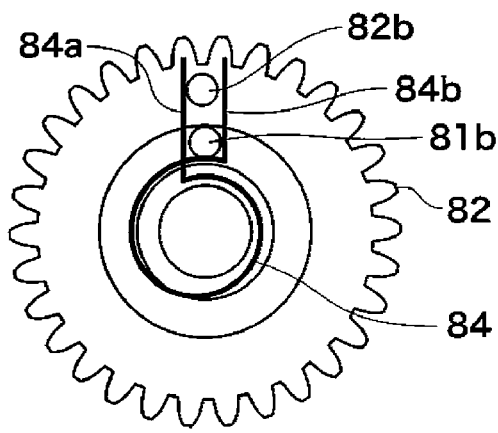
Figure 13C:
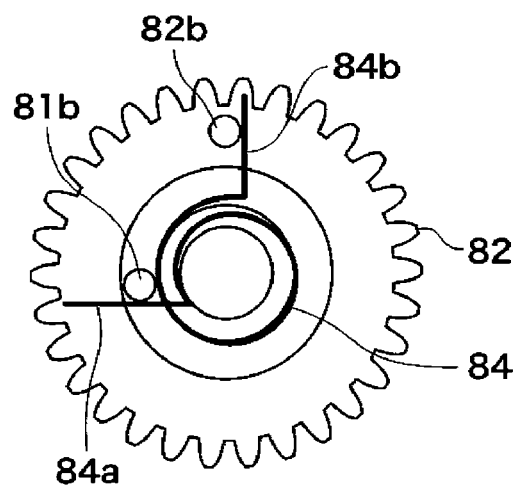

FIGS. 13A to 13C show a phase relation between the prism carrier 81 and the prism delay gear 82 and shows an amount of charge of the torsion spring 84. The prism delay gear 82 has a gear portion which is in mesh with a prism drive gear 85. Engagement portions 81b, 82b are respectively provided on the prism carrier 81 and the prism delay gear 82 so as to face to each other. The engagement portion 81b is disposed radially inwardly of the engagement portion 82b.

The torsion spring 84 has a coil portion and two arm portions 84a, 84b radially outwardly extending from opposite ends of the coil portion. The arm portions 84a, 84b are respectively engaged with the engagement portions 82b, 81b of the prism delay gear 82 and the prism carrier 81. When the lens barrel is assembled, the arm portions 84a, 84b are made in engagement with the engagement portions 82b, 81b in a state where the engagement portions 82b, 81b are disposed in phase with each other as shown in FIG. 13B, so that the torsion spring 84 is precharged.

If the prism carrier 81 is rotated in the just-mentioned state while permitting the prism delay gear 82 to be freely rotatable, the prism carrier 81, prism delay gear 82, and torsion spring 84 integrally rotate. On the other hand, if the prism carrier 81 is rotated in a state that the prism delay gear 82 is restricted to rotate, only the prism carrier 81 rotates while overcharging the torsion spring 84.

Figure 11:
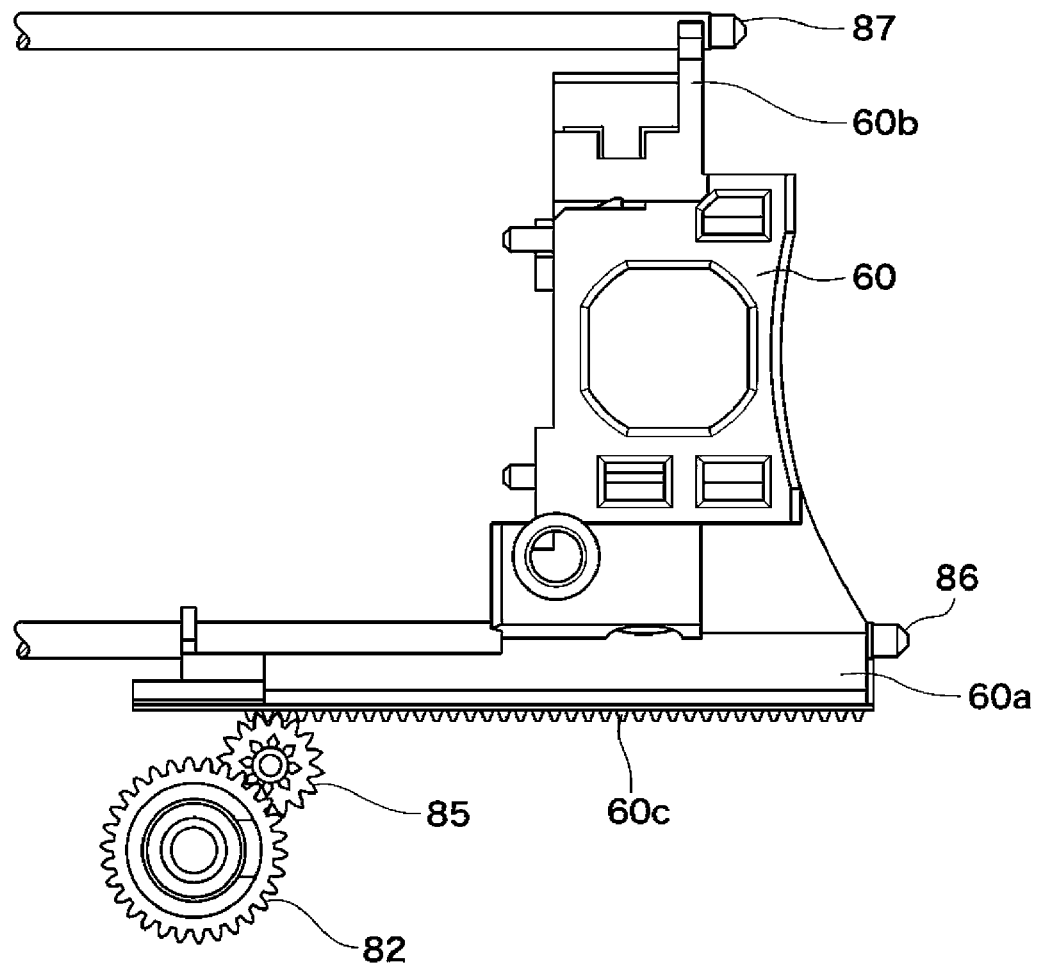
FIG. 11 is a plane view showing a part of a prism drive unit and a prism holding member.

FIG. 11 shows in plane view a part of the prism drive unit 80 and the prism holding member 60.

As shown in FIG. 11, the holding member 60 is provided with engagement portions 60a, 60b that are movably engaged with the guide shafts 86, 87 extending in the direction of the optical axis B. The engagement portion 60a is formed with a rack gear 60c which is in mesh with the prism drive gear 85. With rotation of the prism drive gear 85, the holding member 60 moves forward or rearward in unison with the prism 6 along the optical axis B.

Referring to FIG. 10 and FIG. 14 again, operations of the cam cylinder 61 and the prism 6 will be described.

In a case where the SW motor 67 is driven but the TW motor 53 is stopped from being driven, the sun gear train 57 is rotated by the SW motor 67, whereas the zoom carrier gear 56 coupled to the TW motor 53 is not rotated. Accordingly, the zoom planetary gears 58 do not revolve around but rotate on their own axes.

If it is assumed here that the number of teeth of the sun gear 57b is 9, the number of each zoom planetary gear 58 is 10, and the number of teeth of the internal gear 55a of the zoom ring gear 55 is 30, the rotation speed of the sun gear train 57 is reduced to 1/3.33 times and then conveyed to the zoom ring gear 55. The resultant rotation of the external gear 55b of the zoom ring gear 55 is conveyed through the idler gear 59 to the drive gear 68, and the rotation of the drive gear 68 is conveyed to the gear portion 61a of the cam cylinder 61, whereby the cam cylinder 61 is rotatably driven. At that time, the zoom ring gear 55 rotates in a direction opposite from the rotation direction of the sun gear train 57.

The rotation of the sun gear train 57 is conveyed through the prism planetary gear 83 to the prism carrier 81. If the holding member 60 is movable along the optical axis B, the torsion spring 84 and the prism delay gear 82 rotate in unison with the prism carrier 81, so that holding member 60 is forwardly or rearwardly moved in the direction of the optical axis B. On the other hand, if the holding member 60 is restricted to move in the direction of the optical axis B, the prism delay gear 82 cannot be rotated, and therefore, the torsion spring 84 is overcharged and absorbs the rotation of the prism carrier 81.

In a case where the SW motor 67 is stopped from being driven and the TW motor 53 is driven, the sun gear train 57 coupled to the SW motor 67 is not rotated, whereas the zoom carrier gear 56 coupled to the TW motor 53 is rotated. Accordingly, the zoom planetary gears 58 revolve around while rotating on their own axes. If it is assumed here that the number of teeth of the sun gear 57b is 9, the number of teeth of each zoom planetary gear 58 is 10, and the number of teeth of the internal gear 55a of the zoom ring gear 55 is 30, the rotation speed of the zoom carrier gear 56 is increased to 1.3 times and then conveyed to the zoom ring gear 55, thereby rotatably driving the cam cylinder 61. In that case, the zoom ring gear 55 rotates in the same direction as the rotation direction of the zoom carrier gear 56.

Since the rotation of the sun gear train 57 is stopped, the prism carrier 81 is stopped to rotate, so that no driving force is conveyed to the holding member 60.

In a case where the SW motor 67 and the TW motor 53 are simultaneously driven, a combined rotation speed is conveyed to the zoom ring gear 55. In a case, for example, that the sun gear train 57 is rotated at a rotation speed of 1 rpm in the CW (clockwise) direction and the zoom carrier gear 56 is rotated at a rotation speed of 1 rpm in the CW direction, a rotation speed of 0.3 rpm in the CCW (counterclockwise) direction is conveyed from the sun gear train 57 to the zoom ring gear 55 and a rotation speed of 1.3 rpm in the CW direction is conveyed from the zoom carrier gear 56 to the zoom ring gear 55. As a result of the combination of these rotation speeds, the zoom ring gear 55 is rotated at a rotation speed of 1 rpm in the CW direction.

In a case that the sun gear train 57 is rotated at a rotation speed of 1.3 rpm in the CW direction and the zoom carrier gear 56 is rotated at a rotation speed of 0.3 rpm in the CW direction, a rotation speed of 0.39 rpm in the CCW direction is conveyed from the sun gear train 57 to the zoom ring gear 55 and a rotation speed of 0.39 rpm in the CW direction is conveyed from the zoom carrier gear 56 to the zoom ring gear 55. As a result of the combination of these rotation speeds, the zoom ring gear 55 is stopped to rotate.

As understood from the foregoing description, by properly selecting the rotation speeds and rotation directions of the SW motor 67 and the TW motor 53, it is possible to drive the prism 6 while stopping the rotation of the cam cylinder 61 and to increase the speed reduction ratio of the gear train coupled to the SW motor 67 but decrease the speed reduction ratio of the gear train coupled to the TW motor 53.

Next, with reference to FIGS. 12 and 13, a description will be given of an operation of placing the prism 6 in the photographing position by moving the first and second lens groups 10, 20 forward in the direction of the optical axis A.

FIG. 12 shows the inner peripheral surface of the fixed cylinder 62 in development view. As shown in FIG. 12, on the inner peripheral surface of the fixed cylinder 62, there are formed, at equal circumferential intervals, cam grooves 62a with which cam pins formed on the outer peripheral surface of the cam cylinder 61 are engaged. The fixed cylinder 62 is formed at its rear end portion with a notched opening 62b through which the prism holding member 60 passes when the holding member 60 is moved forward or rearward in the direction of the optical axis B. As previously described referring to FIG. 16, the second group barrel 21 is formed with the grooves 21a, 21b such that the barrel 21 does not interfere with the guide shafts 86, 87. Similar grooves are formed in each of the cam cylinder 61 and the rectilinear guide cylinder 63.

When the lens barrel is at the SINK position, the cam pins of the cam cylinder 61 are positioned at positions (one of which is shown by reference numeral 62c in FIG. 12) in the cam grooves 62a of the fixed cylinder 62. At that time, the prism carrier 81 and the prism delay gear 82 are in a phase relation shown in FIG. 13A in which the torsion spring 84 is overcharged. In that state, the holding member 60 is urged by the charged force of the torsion spring 84 toward a retraction side (toward the image pickup device 8) in the direction of the optical axis B, but is restricted by a mechanical end (not shown) to move toward the retraction side.

To place the lens barrel in a photographing state, the SW motor 67 is rotated in the direction to move the cam cylinder 61 forward, i.e., in the direction to extend the cylinder 61, so that the cam pins of the cam cylinder 61 move in the cam grooves 62a of the fixed cylinder 62 to the right in FIG. 12. As a result, the cam cylinder 61 moves forwardly relative to the fixed cylinder 62 along the optical axis A. In lift sections of the cam grooves 62a, the first and second lens groups 10, 20 are moved in an extension direction, i.e., in a forward direction, along the optical axis A.

During the just-mentioned extension operation, the prism carrier 81 is also rotated in a direction to cause the holding member 60 to move toward the photographing position. However, since the torsion spring 84 is in an overcharged state, the prism delay gear 82 is kept stopped, and therefore, the holding member 60 does not move from the retracted position.

When the cam cylinder 61 is moved forwardly in the direction of the optical axis A, a space is formed to permit the holding member 60 to move toward the photographing position, and the phase of the engagement portion 81b of the prism carrier 81 becomes coincident with that of the engagement portion 82b of the prism delay gear 82 as shown in FIG. 13B.

When the SW motor 67 is rotated in the direction to forwardly move or extend the cam cylinder 61, the cam pins of the cam cylinder 61 move in the cam grooves 62a of the fixed cylinder 62 to the right in FIG. 12, and at the same time the holding member 60 moves toward the photographing position.

When the cam cylinder 61 reaches the WIDE position, the TW motor 53 is driven in the direction to move the cam cylinder 61 rearwardly, while driving the SW motor 67 in the direction to forwardly move the cam cylinder 61. As a result, only the holding member 60 continues to move toward the photographing position along the optical axis B, with the cam cylinder 61 kept stopped at the WIDE position.

When reaching the photographing position, the holding member 60 abuts against a photographing-side stopper (not shown) and stops to move, and at the same time the prism delay gear 82 also stops to rotate. At that time, the SW motor 67 is continued to be driven in the direction to forwardly move the cam cylinder 61, whereby the prism carrier 81 is kept rotated in the direction to move the holding member 60 forwardly toward the photographing position, whereby the torsion spring 84 is overcharged. By the torsion spring 84 overcharged to some extent, the holding member 60 is urged toward the photographing-side stopper, whereby an effect to stabilize the position and orientation of the holding member 60 can be attained at the time of photographing.

When the torsion spring 84 is brought to a predetermined overcharged state, the SW motor 67 and the TW motor 53 are stopped to rotate.

With the above operations, the first and second lens groups 10, 20 and prism 6 are placed in the WIDE position. When the cam cylinder 61 reaches the WIDE position, the cam pins are positioned at positions (one of which is denoted by reference numeral 62d in FIG. 12) in the cam grooves 62a of the fixed cylinder 62.

Subsequently, the stepping motor 32 is driven to move the third lens group 30 up to the reset position shown in FIG. 20B. At that time, information representing the position of the third lens group 30 is reset. Then, the control unit reversely rotates the stepping motor 32 to thereby move the third lens group 30 up to a predetermined position, while counting pulses.

Since the fourth lens group 40 is urged by the tension spring 43 toward the third lens group 30, the fourth lens group 40 moves in unison with the third lens group 30 in the direction of the optical axis B over the first movement section from the SINK position to the abutment position where the arm portion 41b of the fourth lens group 40 is brought to abut against the stopper portion 64b.

After the arm portion 41b is brought to abut against the stopper portion 64b, the fourth lens group 40 is kept stopped at the abutment position and separated from the third lens group 30 that continues to move in the second movement section adjacent to the first movement section.

To move the lens barrel from the WIDE position to the SINK position, reverse operations opposite to the above-described operations are performed. First, the stepping motor 42 is driven to retreat the fifth lens group 50 toward the image pickup device 8 along the optical axis B. Next, the stepping motor 32 is driven to move the third lens group 30 toward the image pickup device 8. As a result, the third lens group 30 gets close to the fourth lens group 40, so that the light-shielded state of the photointerrupter 39 by the light shield plate 41a shifts from the state shown in FIG. 20C to the state shown in FIG. 20B and to the state shown in FIG. 20A. In other words, the light receiving sensor 39a of the photointerrupter 39 shifts from the non-light-shielded state to the light-shielded state.

By driving the stepping motor 32 to further move the third lens group 30 from the state shown in FIG. 20A, the third lens group 30 is brought to abut against the fourth lens group 40, so that the arm portion 41b is separated from the stopper portion 64b. At the abutment position, a shift is made from the second movement section to the first movement section.

By further driving the stepping motor 32, the third lens group 30 is retracted in unison with the fourth lens group 40 toward the image pickup device 8 along the optical axis B. Next, the TW motor 53 is driven to the direction to forwardly move the cam cylinder 61 and at the same time the SW motor 67 is driven to the direction to rearwardly move the cam cylinder 61. As a result, the cam cylinder 61 does not rotate and only the prism carrier 81 rotates in the direction to forwardly move the holding member 60 toward the photographing position.

Then, the prism carrier 81 rotates by an amount corresponding to the overcharge of the torsion spring 84, so that the phase of the engagement portion 81b of the prism carrier 81 becomes coincident with that of the engagement portion 82b of the prism delay gear 82. The prism delay gear 82 rotates in unison with the prism carrier 81 and the torsion spring 84 in the direction to rearwardly move the holding member 60 toward the retracted position.

When the holding member 60 moves up to the retracted position so that a storage space is formed at the rear of the cam cylinder 61, the TW motor 53 is stopped to rotate and only the SW motor 67 is continued to be driven in the direction to rearwardly move the cam cylinder 61. When moving up to the retracted position, the holding member 60 is brought to abut against a retraction-side mechanical end (not shown) and stopped to move, and at the same time the prism delay gear 82 is stopped to rotate.

Since the SW motor 67 is continued to be driven in the direction to rearwardly move the cam cylinder 61 up to the storage position, the prism carrier 81 is continued to rotate in the direction to rearwardly move the holding member 60 to the retracted position, while overcharging the torsion spring 84. When the cam cylinder 61 is stored in the SINK position, the first and second lens groups 10, 20 are stored into the storage space and the SW motor 67 is stopped to rotate.

To perform a zooming operation of the lens barrel between the WIDE position and the TELE position, only the TW motor 53 is driven, whereby the first and second lens groups 10, 20 can be moved in the direction of the optical axis A, without moving the holding member 60 in the direction of the optical axis B. When the lens barrel is at the TELE position, the cam pins of the cam cylinder 61 are positioned at positions (shown by reference numeral 62e in FIG. 12) in the cam grooves 62a of the fixed cylinder 62.

The following is a description of an effect attained by increasing the speed reduction ratio of the gear train coupled to the SW motor 67 and decreasing the speed reduction ratio of the gear train coupled to the TW motor 53 as previously described.

Usually, a load for driving the cam cylinder 61 is greater in a region from the SINK position to the photographing position in which the lift angle of the cam grooves 62a of the fixed cylinder 62 is large (hereinafter, referred to as the retraction/extension region) than in a region from the WIDE position to the TELE position (hereinafter, referred to as the photographing region). In the retraction/extension region, a load for operating a lens barrier (not shown) is applied in many cases in addition to the load for driving the cam cylinder 61. It is therefore necessary to use a gear train having a large speed reduction ratio to increase the motor torque.

On the other hand, in the photographing region, it is necessary to suppress the motor rotation speed to prevent a lens drive sound from being recorded during, e.g., moving-image photographing. At that time, the rotational speed of the cam cylinder becomes extremely low, if a gear train having a large speed reduction ratio is used.

In this embodiment, in the retraction/extension region where the drive load of the cam cylinder 61 is large, the cam cylinder 61 is driven by conveying the driving force of the SW motor 67 to the cam cylinder 61 through a gear train having a large speed reduction ratio. In the photographing region, the cam cylinder 61 is driven by conveying the driving force of the TW motor 53 to the cam cylinder 61 through a gear train having a small speed reduction ratio. As a result, a satisfactory zooming operation speed can be attained, even if the TW motor 53 is rotated at a low speed so as to reduce the motor drive sound during moving-image photographing.

In this embodiment, the SW motor 67 and the TW motor 53 can be configured by using different types of motors. For example, the SW motor 67 can be implemented by a DC motor, whereas the TW motor 53 can be implemented by a stepping motor. The stepping motor can be more stably controlled at a low speed than the DC motor, and is therefore suitable for low-speed driving during moving-image photographing.

The stepping motor can be driven by selectively using micro-step driving or two-phase excitation driving. The stepping motor can be highly quietly driven by using the micro-step driving, and can be driven with high torque by using the two-phase excitation driving. It is therefore preferable, for example, that the micro-step driving be used for a zooming operation in the moving image photographing where quietness is required, whereas the two-phase excitation driving be used for a zooming operation in the still image photographing.

The gear train of the drive mechanism of this embodiment is configured that the cam cylinder 61 can be driven by the drive of either the SW motor 67 or the TW motor 53 in the entire region including the retraction/extension region and the photographing region. Accordingly, it is possible to selectively use these motors such that the SW motor 67 is used in a case where a high-speed zooming operation is required, whereas the TW motor 53 is used in a case where a low-speed zooming operation is required.

Referring to FIGS. 10 and 14 again, a description will be given of a pulse gear train 70 for detecting positions of the first and second lens group 10, 20 in the direction of the optical axis A.

As shown in FIGS. 10 and 14, the pulse gear train 70 is coupled to the idler gear 59 and also coupled to the zoom ring gear 55 serving as then output gear of the planetary gear train. The pulse gear train 70 has a final-stage pulse plate 71 provided with plural blades and a photointerrupter 72 for counting the number of times of passage of the blades to detect an amount of rotation of the cam cylinder 61. The speed increase ratio of the pulse gear train 70 and the number of blades of the pulse plate 71 are decided to attain the required resolution determined by optical design.

In a case where a gear train is used to transmit the driving force of a motor, an amount of rotation of a cam cylinder is determined based on a speed reduction ratio as a linear function of an amount of motor rotation, if for example there is no slip loss in the amounts of rotations. Actually, however, the amount of rotation of the cam cylinder relative to the amount of rotation of the motor varies due to backlash or engagement error between gears.

In a gear train of a conventional lens barrel having a cam cylinder driven by a single motor, an engagement relation between gears at the time of driving the motor is kept unchanged after the gear train has once been assembled. In other words, a variation in the amount of rotation of the cam cylinder relative to the amount of rotation of the motor remains unchanged at every driving of the motor since the same teeth are always engaged. Accordingly, the amount of rotation of the cam cylinder can be determined by calculation based on the amount of rotation of the motor, with a small error from an actual amount of rotation.

On the other hand, in a case where the cam cylinder is driven by two motors whose amounts of rotations are combined by means of a planetary gear train as in the present embodiment, the rotation of one of the motors causes a change in the engagement relation between the zoom ring gear 55 and a gear on the side of the other motor.

In other words, a variation in the amount of rotation of the cam cylinder relative to the amount of rotation of the motor changes every time the power of the camera is turned on. Accordingly, if the amount of rotation of the cam cylinder is determined by calculation based on the amount of rotation of the motor, there is a fear that the determined amount of rotation of the cam cylinder has a large error from an actual amount of rotation.

In this embodiment, however, since the pulse gear train 70 is branched from the idler gear 59 disposed between the cam cylinder 61 and the zoom ring gear 55 serving as the output gear of the planetary gear train, the gear engagement relation between the pulse gear train 70 and the cam cylinder 61 remains unchanged. Accordingly, the amount of rotation of the cam cylinder 61 can be detected with an error equivalent to that in the conventional lens barrel.

As described above, in this embodiment, changeover between the first movement section where the third lens group 30 moves in unison with the fourth lens group 40 and the second movement section where only the third lens group 40 moves is detected by the photointerrupter 39, and the positional relation between the third and fourth lens group 30, 40 is reset. As a result, the position of the third lens group 30 after the reset can be controlled based on pulse count. With the arrangement having the light shield plate 41a formed integrally with the fourth lens group 40 and having the photointerrupter 39 movable in unison with the third lens group 30, it is possible to shorten the length of the light shield plate 41a as viewed in the direction of the optical axis B. As a result, it becomes unnecessary, for example, to provide the zoom body 64 with spaces for installation of the photointerrupter 39 and the light shield plate 41a. This contributes to making the lens barrel compact in size. Thus, the detection unit constituted by the photointerrupter 39 and the light shield plate 41a can easily be made compact and the degree of freedom of installation can be increased.

This invention is not limited in construction to the example described in the embodiment. Various changes and modifications may be made in terms of material, shape, size, form, number, installation position, etc. without departing from the spirit and scope of this invention.

For example, the prism 6 is used as the reflection optical element in the above-described embodiment, but this is not limitative. Alternatively, a mirror or the like can be used. In the above-described embodiment, the third group base plate 31 and the third group cover 38 are integrally formed, but the photointerrupter 39 can be attached directly to the third group base plate 31, with the third group cover 38 omitted.

In the above-described embodiment, the photointerrupter 39 is disposed on the third lens group 30 and the light shield plate 41a is disposed on the fourth lens group 40. Conversely, the photointerrupter 39 can be disposed on the fourth lens group 40 and the light shield plate 41a can be disposed on the third lens group 30.

The detection unit is configured by the photointerrupter 39 having the light emitting device and the light receiving sensor 39a that are disposed to face each other, but this is not limitative. A photoreflector can be used. For example, it is possible to configure that the light emitting device and the light receiving device are disposed on the same side, a reflection surface for reflecting light emitted from the light emitting device is disposed to face the light emitting device, and the light shield plate 41a is disposed to intercept a light path extending from the light emitting device to the reflection surface and to the light receiving device. Alternatively, it is possible to configure that the light emitting device and the light receiving device are provided in the third lens group 30 and the reflection device is provided in the fourth lens group 40 such that light emitted from the light emitting device is reflected by the reflection device and then received by the light receiving device. The detection unit is not limited to the photosensor, but may be a magnetic sensor, ultrasonic sensor, or the like.

In the above-described embodiment, the entire movement section of the third lens group 30 is constituted by the first movement section where the third lens group 30 moves in unison with the fourth lens group 40 and the second movement section where the third lens group 30 moves singly, and a boundary between the first and second movement sections is specified by the position where the arm portion 41b is brought to abut against the stopper portion 64b, but these are not limitative. It is enough to configure that the first and second movement sections are changed over by means of any mechanism or control.

As the urging unit for urging the fourth lens group 40 toward the third lens group 30, the tension spring 43 is used. Alternatively, an elastic member such as a spring or rubber can be used.

In the above-described embodiment, as the two optical systems of the lens barrel, the third and fourth lens groups 30, 40 are shown. However, the present invention is applicable to any lens barrel having various types of two optical systems disposed adjacent to each other and movable in a common optical axis direction to perform at least one of a zooming operation, retraction operation, and focusing operation.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-183298, filed Aug. 18, 2010, which is hereby incorporated by reference herein in its entirety.

What is claimed is:
1. A lens barrel comprising:
first and second optical systems movable in a common optical axis direction and disposed adjacent to each other; and
a detection unit having a detecting part provided in one of said first and second optical systems and a detected part provided in another of said first and second optical systems, said detection unit being configured to detect whether a distance between said first and second optical systems in the optical direction becomes equal to a predetermined distance, wherein said first optical system moves in unison with said second optical system in a first movement section of said first optical system, and only said first optical system moves in a second movement section of said first optical system, the second movement section being provided adjacent to the first movement section.

2. The lens barrel according to claim 1, including:
a drive unit configured to drive said first optical system;
an urging unit configured to urge said second optical system toward said first optical system; and
a restriction part configured to be in contact with said second optical system moving toward said first optical system in the first movement section to thereby restrict movement of said second optical system toward said first optical system, wherein with movement of said first optical system, changeover between the first and second movement sections is made at a position where said second optical system is brought in and out of contact with said restriction part.

3. The lens barrel according to claim 1, wherein a start point of the first movement section is a storage position of said first optical system, and
an absolute position of said first optical system from the storage position is determined based on a position assumed by said first optical system when it is detected by said detection unit that the distance between said first and second optical systems in the optical direction becomes equal to the predetermined distance.

4. The lens barrel according to claim 1, wherein the detecting part of said detection unit is comprised of a photosensor.

* * * * *